(12) United States Patent
McAllister

(10) Patent No.: US 12,134,287 B1
(45) Date of Patent: Nov. 5, 2024

(54) LOAD MEASURING HITCH ASSEMBLY FOR MEASURING LOADS APPLIED BY A TRAILER ON A TOW VEHICLE

(71) Applicant: Weigh Safe, LLC, Lindon, UT (US)

(72) Inventor: Morgan McAllister, Lindon, UT (US)

(73) Assignee: Weigh Safe, LLC, Lindon, UT (US)

( * ) Notice: Subject to any disclaimer, the term of this patent is extended or adjusted under 35 U.S.C. 154(b) by 336 days.

(21) Appl. No.: 17/681,562

(22) Filed: Feb. 25, 2022

Related U.S. Application Data

(60) Provisional application No. 63/153,730, filed on Feb. 25, 2021.

(51) Int. Cl.
  *B60D 1/24* (2006.01)
  *B60D 1/06* (2006.01)
  *G01L 5/13* (2006.01)

(52) U.S. Cl.
  CPC ............. *B60D 1/248* (2013.01); *B60D 1/065* (2013.01); *G01L 5/136* (2013.01)

(58) Field of Classification Search
  CPC ................................ B60D 1/065; G01L 5/136
  USPC .......................................................... 177/136
  See application file for complete search history.

(56) References Cited

U.S. PATENT DOCUMENTS

| | | | | |
|---|---|---|---|---|
| 6,722,684 | B1 * | 4/2004 | McAllister | ............... B60D 1/06 280/483 |
| 8,696,011 | B2 * | 4/2014 | Despres | ................. B60D 1/241 280/495 |
| 10,759,241 | B2 | 9/2020 | McAllister | |
| 11,701,932 | B2 | 7/2023 | McAllister | |
| 11,813,904 | B2 * | 11/2023 | Anderson | .............. G01G 19/08 |
| 11,897,298 | B2 | 2/2024 | McAllister | |
| 2015/0306929 | A1 * | 10/2015 | McAllister | ............. B60D 1/248 177/136 |
| 2017/0334255 | A1 * | 11/2017 | McAllister | ............. G01G 5/006 |
| 2021/0170818 | A1 | 6/2021 | Doman | |
| 2022/0363096 | A1 | 11/2022 | Doman | |

* cited by examiner

*Primary Examiner* — Jacques M Saint Surin
(74) *Attorney, Agent, or Firm* — Thorpe North & Western, LLP; David W. Osborne

(57) ABSTRACT

Load measuring hitch assemblies are disclosed and described. In one embodiment, the assembly can include a body portion operable to facilitate coupling the load measuring hitch assembly to a tow vehicle. The assembly can also include at least one load cell operable to measure force in at least one measurement axis. Additionally, the assembly can include a ball portion having a ball operable to facilitate coupling the load measuring hitch assembly to a trailer. The ball portion and the body portion can be coupled to one another via the at least one load cell and a pin slot joint. The pin slot joint can provide relative motion between the ball portion and the body portion in a rotational degree of freedom about a first axis and a translational degree of freedom along a second axis. The first and second axes can be orthogonal to one another. The rotational and translational degrees of freedom between the ball portion and the body portion can facilitate transfer of a force to the at least one load cell in the at least one measurement axis, thereby facilitating determining a magnitude of at least one of a vertical or a horizontal force acting on the ball.

25 Claims, 14 Drawing Sheets

LOAD MEASURING HITCH ASSEMBLY FOR MEASURING LOADS APPLIED BY A TRAILER ON A TOW VEHICLE

PRIORITY DATA

This application claims the benefit of U.S. Provisional Patent Application Ser. No. 63/153,730, filed on Feb. 25, 2021 which is incorporated herein by reference.

FIELD OF THE INVENTION

The present invention relates generally to trailer hitch devices, systems, and associated methods. Accordingly, the present invention involves the mechanical arts field.

BACKGROUND OF THE INVENTION

When towing a trailer behind a vehicle, one factor that can significantly affect safety is the hitch or tongue weight (i.e., static downward force) that the trailer applies to the hitch of the tow vehicle. If the hitch or tongue of the trailer does not apply enough downward force to the tow vehicle hitch, a dangerous condition called trailer sway could result. If the hitch or tongue of the trailer applies too much downward force to the tow vehicle hitch, then the rear tires of the tow vehicle can be overloaded, thus pushing the rear of the vehicle around and compromising steering and/or braking of the tow vehicle. A generally acceptable tongue weight for a "bumper pull" trailer is somewhere between 9% and 15% of the gross trailer weight (GTW), and a generally acceptable hitch weight for a "bed mount" (e.g., gooseneck) trailer is somewhere between 15% and 25% of the GTW. In addition to using the GTW for purposes of achieving a safe tongue weight, maintaining GTW within applicable trailer and tow vehicle manufacturer specified limits is another important factor in towing safety. Determining the GTW typically involves weighing the trailer, such as at a truck stop weigh station.

SUMMARY OF THE INVENTION

Load measuring hitch assemblies are provided. In one embodiment, a load measuring hitch assembly can include a body portion operable to facilitate coupling the load measuring hitch assembly to a tow vehicle. The assembly can also include at least one load cell operable to measure force in at least one measurement axis. Additionally, the assembly can include a ball portion having a ball operable to facilitate coupling the load measuring hitch assembly to a trailer. The ball portion and the body portion can be coupled to one another via the at least one load cell and a pin slot joint. The pin slot joint can provide relative motion between the ball portion and the body portion in a rotational degree of freedom about a first axis and a translational degree of freedom along a second axis. The first and second axes can be orthogonal to one another. The rotational and translational degrees of freedom between the ball portion and the body portion can facilitate transfer of a force to the at least one load cell in the at least one measurement axis, thereby facilitating determining a magnitude of at least one of a vertical or a horizontal force acting on the ball.

In other embodiments, there are provided load measuring hitch systems. In still other embodiments, there are provided methods of measuring loads applied by a trailer on a tow vehicle.

DETAILED DESCRIPTION OF THE INVENTION

Definitions

Figure 1:
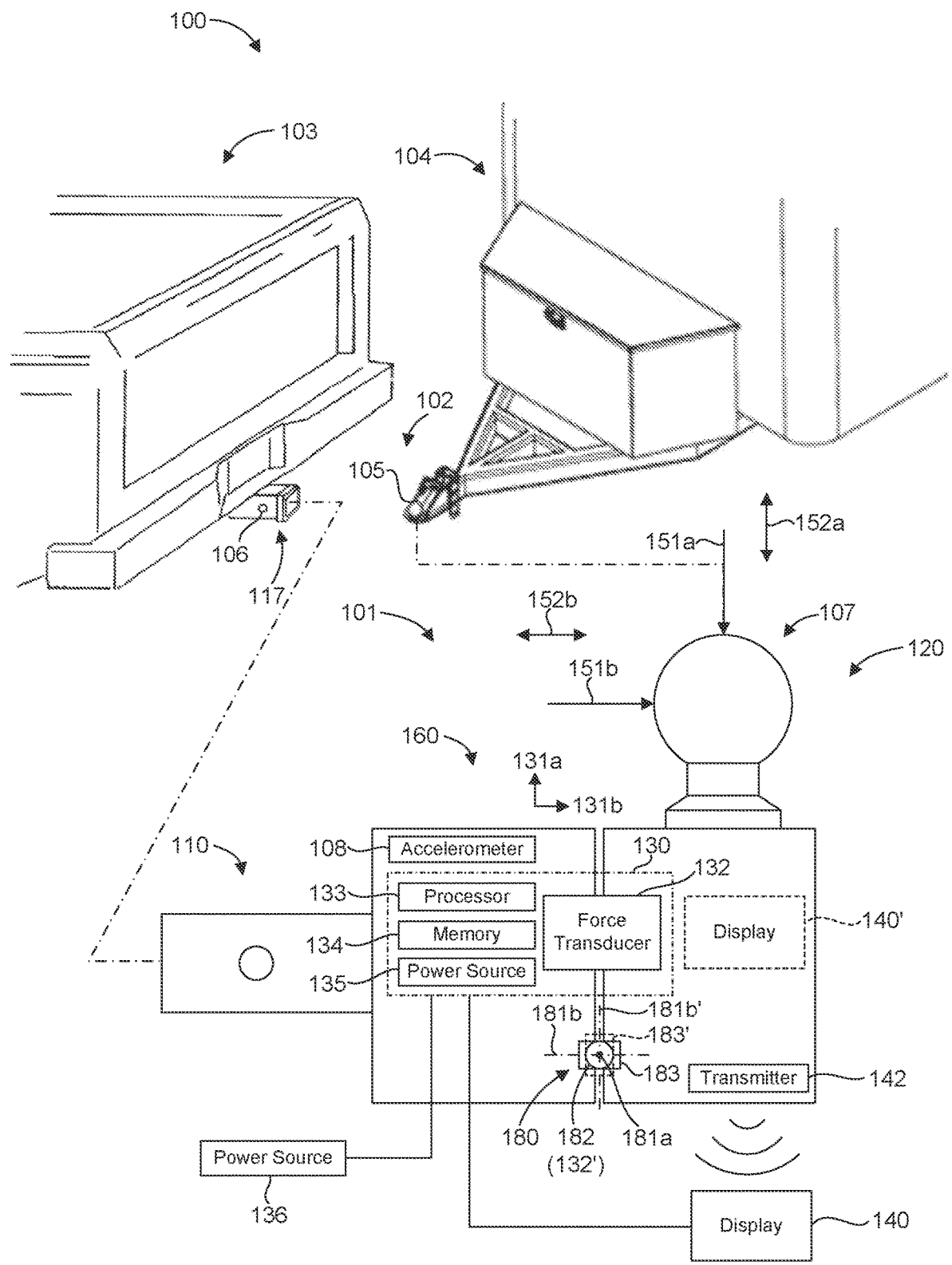
FIG. 1 illustrates a trailer hitch system for measuring hitch loads applied by a trailer, in accordance with an example of the present disclosure.

In describing and claiming the present invention, the following terminology will be used in accordance with the definitions set forth below.

The singular forms "a," "an," and, "the" include plural referents unless the context clearly dictates otherwise.

As used herein, the term "about" is used to provide flexibility to a numerical range endpoint by providing that a given value may be "a little above" or "a little below" the endpoint.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term, like "comprising" or "including," in this written description, it is understood that direct support should also be afforded to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects or structures described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, comparative terms such as "increased," "decreased," "better," "worse," "higher," "lower," "enhanced," "maximized," "minimized," and the like refer to a property of a device, component, composition, or activity that is measurably different from other devices, components, compositions or activities that are in a surrounding or adjacent area, that are similarly situated, that are in a single device or composition or in multiple comparable devices or compositions, that are in a group or class, that are in multiple groups or classes, or as compared to the known state of the art.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

The term "coupled," as used herein, is defined as directly or indirectly connected in a chemical, mechanical, electrical or nonelectrical manner. Objects described herein as being "adjacent to" each other may be in physical contact with each other, in close proximity to each other, or in the same general region or area as each other, as appropriate for the context in which the phrase is used. "Directly coupled" refers to objects, components, or structures that are in physical contact with one another and attached.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Invention Embodiments

With reference to FIG. 1, illustrated is a trailer hitch system 100 for measuring hitch loads (e.g., vertical loads, such as ball weight, pin weight, or tongue weight, and horizontal or lateral loads, such as fore/aft loads) applied by a trailer, in accordance with an example of the present disclosure. In general, the trailer hitch system 100 can include a load measuring hitch assembly 101 operable to couple with a tow vehicle 103, and a trailer 104 operable to couple to the tow vehicle 103 via the load measuring hitch assembly 101. The load measuring hitch assembly 101 is schematically illustrated in FIG. 1.

The load measuring hitch assembly 101 can be included in a load measuring hitch system 102, which can also include an attachment structure 117 operable to be associated with the tow vehicle 103 (FIG. 1) to facilitate coupling the load measuring hitch assembly 101 to the tow vehicle 103. In one aspect, the load measuring hitch assembly 101 can be adapted to serve as a hitch ball or ball mount for a variety of different hitch configurations. For example, the attachment structure 117 can be any typical horizontally-oriented hitch receiver, such as a standard 2½", 2", or 1¼" size square hitch receiver for receiving hitch components (e.g., drawbars) for "bumper pull" style hitches. In one aspect, the load measuring hitch assembly 101 can include a hitch portion 110, which can be configured to interface with the attachment structure 117 to facilitate coupling the load measuring hitch assembly 101 to the tow vehicle 103.

In one aspect, the load measuring hitch assembly 101 can include a support structure or body portion 160, which can facilitate coupling the load measuring hitch assembly 101 to the tow vehicle 103 (e.g., via the hitch portion 110 and the attachment structure 117). In some examples, the hitch portion 110 and the body portion 160 can be integrally formed with one another and/or permanently attached to one another (e.g., formed from the same block or billet of material and/or welded to one another). In other examples, the hitch portion 110 and the body portion 160 can be removably attached to one another (e.g., via a fastener).

The load measuring hitch assembly 101 can include a ball portion 120, which can have a hitch ball 107 to facilitate coupling the load measuring hitch assembly 101 to the trailer 104. For example, the hitch ball 107 (e.g., a goose ball, a ball mount, etc.) can be configured to engage with a coupling device 105 of the trailer 104 (e.g., a gooseneck, a tongue, etc.). In one aspect, the hitch ball 107 can include a ball 138 and a lower portion 162. The ball 138 can be configured to interface with the coupling device 105 of the trailer 104 (e.g., a trailer tongue, gooseneck, etc.). The ball 138 and the lower portion 162 can be separate and distinct structures coupled to one another (i.e., rigidly and fixedly coupled) or the ball 138 and the lower portion 162 can form a single, monolithic structure. In either case, the hitch ball 107 can be a single structure comprised of multiple component parts or portions that remain in a fixed relationship to one another.

The load measuring hitch assembly 101 can also include a load measurement device 130 operable to determine a force in at least one measurement axis (e.g., at least one of axes 131a, 131b, which may be (optionally) orthogonal to one another), which can sense vertical and/or horizontal forces on the ball 138 as discussed in more detail below. The load measurement device 130 can comprise any suitable type of load measurement device or mechanism described herein. For example, the load measurement device 130 can comprise at least one load cell or transducer 132, such as a strain gage load cell (e.g., having one or more strain gauges in any suitable configuration known in the art, such as any Wheatstone bridge configuration). The load measurement device 130 can be or include any suitable configuration, such as a load pin configuration.

In general, the load measurement device 130 (e.g., the load cell or transducer 132) can be operably coupled to the hitch ball 107 to facilitate determining a magnitude of a force 151a, 151b acting on the hitch ball 107 (e.g., through the trailer interface with the ball 138) in at least one of two directions 152a, 152b (e.g., vertical and horizontal directions). For example, when a force 151a, 151b is applied to the ball 138, the load measurement device 130 (e.g., the transducer 132) can strain or deflect as a result of the applied force transferred to the load measurement device 130. The vertical force 151a can represent a tongue weight of the trailer 104. The horizontal force 151b may be applied by the trailer 104 as the tow vehicle 103 tows the trailer 104. Thus, a magnitude of the horizontal force 151b is applied by the tow vehicle 103 to the trailer 104 in order to accelerate the trailer 104. In one aspect, a known magnitude of the horizontal force 151b can be used to determine the gross weight of the trailer 104. For example, the trailer hitch system 100 can include an accelerometer 108 operable to determine a magnitude of acceleration (e.g., of tow vehicle 103 and the trailer 104) in the horizontal direction 152b. During acceleration of the tow vehicle 103 and the trailer 104, the magnitude of the horizontal force 151b and the magnitude of the acceleration in the horizontal direction 152b can be measured or otherwise determined by the load measurement device 130 and the accelerometer 108, respectively. According to Isaac Newton's Second Law of Motion, the net force on an object is equal to the mass of the object multiplied by the acceleration of the object. Thus, the gross mass of the trailer 104 can be determined by dividing the magnitude of the horizontal force 151b by the magnitude of the acceleration in the horizontal direction 152b. Similarly, the gross weight of the trailer 104 can be determined by multiplying the gross mass of the trailer 104 by the acceleration due to gravity (which may be an assumed typical value or a more exact value based on the actual geographical location).

The load measurement device 130 (e.g., the transducer 132) can be operably associated with the body portion 160 and the ball portion 120 to determine a magnitude of a force 151a, 151b acting on the hitch ball 107 (e.g., through the trailer interface with the ball 138) in at least one of the two directions 152a, 152b. For example, the ball portion 120 and the body portion 160 can be coupled to one another via the load measurement device 130 (e.g., the transducer 132 such as a load cell) and a pin slot joint 180. In other words, the ball 138 and the body portion 160 are separate components and can be coupled to one another by the load measurement device 130 (e.g., the transducer 132) and the pin slot joint. The forces 151a, 151b applied by the trailer 104 to the ball 138 can be transferred to body portion 160 (i.e., to the tow vehicle 103) through the load measurement device 130 (e.g., the transducer 132), which can facilitate determining the magnitude of the forces 151a, 151b.

As used herein, the term "pin slot joint" (also referred to a "pin-in-slot joint" or "pin in a slot joint") refers to a joint with one translational degree of freedom and one rotational degree of freedom. One prismatic primitive (e.g., a sliding joint) provides the translational degree of freedom. One revolute primitive (e.g., a pin joint) provides the rotational degree of freedom. The prismatic and revolute motion axes are mutually orthogonal. The pin slot joint 180 can include a pin 182 in a slot 183 or any other structure that allows rotation and translation within the constraints of a pin slot joint described above.

The pin slot joint 180 can facilitate relative movement between the ball portion 120 and the body portion 160 sufficient to enable a transfer of force from the hitch ball 107 to the load measurement device 130 in at least one of the two directions 152a, 152b, which can facilitate determining the magnitude of the force 151a, 151b acting on the hitch ball 107 in the respective directions 152a, 152b. For example, the pin slot joint 180 can provide relative motion between the ball portion 120 and the body portion 160 in a rotational degree of freedom about an axis 181a (out of the page) and a translational degree of freedom along an axis 181b (as dictated by an orientation of the slot 183). The axes 181a, 181b can be orthogonal to one another. In one alternative, the pin slot joint 180 can provide relative motion between the ball portion 120 and the body portion 160 in a translational degree of freedom along an axis 181b' (as dictated by an orientation of the slot 183'). The axes 181a, 181b' can be orthogonal to one another.

The rotational degree of freedom about the axis 181a between the ball portion 120 and the body portion 160 can facilitate transfer of a force 151a, 151b from the hitch ball 107 to the load measurement device 130 in at least one of the vertical direction 152a or the horizontal direction 152b. Similarly, the translational degree of freedom along the axis 181b (or 181b') between the ball portion 120 and the body portion 160 can facilitate transfer of a force 151a, 151b from the hitch ball 107 to the load measurement device 130 in at least one of the vertical direction 152a or the horizontal direction 152b. The use of the pin slot joint 180 in combination with the load measurement device 130 to couple the ball portion 120 and the body portion 160 to one another can enable the load measurement device 130 to sense the force transferred from the hitch ball 107 in two measurement axes 131a, 131b. The geometric relationship between the ball 138, the pin slot joint 180, and the load measurement device 130 (e.g., the transducer 132), as well as any angular offset in the orientation of the directions 152a, 152b and the measurement axes 131a, 131b, can be accounted for in determining the force 151a, 151b from the force data sensed by the load measurement device 130 (e.g., the transducer 132).

In some examples, the pin 182 can be configured as a load cell or transducer 132' that functions as part of the load measurement device 130. In this case, one load cell or transducer can be used to determine the force 151a and another load cell or transducer can be used to determine the force 151b. For example, if the slot 183 is configured to provide a translational degree of freedom along a horizontally oriented axis 181b, then the load cell or transducer 132' can measure force in the measurement axis 131a, which can be parallel to the vertical direction 152a and therefore used to determine the magnitude of the vertical force 151a. The load cell or transducer 132 can be configured to measure force in the measurement axis 131b, which can be parallel to the horizontal direction 152b and therefore used to determine the magnitude of the horizontal force 151b. On the other hand, if the slot 183 is configured to provide a translational degree of freedom along a vertically oriented axis 181b', then the load cell or transducer 132' can measure force in the measurement axis 131b, which can be parallel to the horizontal direction 152b and therefore used to determine the magnitude of the horizontal force 151b. The load cell or transducer 132 can be configured to measure force in the measurement axis 131a, which can be parallel to the vertical direction 152a and therefore used to determine the magnitude of the vertical force 151a. The load cell or transducer 132, 132' configurations described above can isolate vertical and horizontal loads to a given load cell or transducer 132, 132', which can each be configured to measure or sense force in only a single axis or direction. Thus, the load cells or transducers 132, 132' can each individually be used to determine a magnitude of a vertical or a horizontal force.

The load measurement device 130 can include any suitable mechanical, electrical, and/or electromechanical device that can facilitate a determination of the magnitude of the force 151a, 151b acting on the hitch ball 107. For example, the load measurement device 130 can include a processor 133 and/or memory 134 to determine the magnitude of the load on the hitch ball 107. The processor 133 and/or memory 134 can be powered by a power source 135 (e.g., a battery) included in the load measurement device 130 and/or the processor 133 and/or memory 134 can be powered by a remote power source 136, which may be located on or otherwise associated with the tow vehicle 103 or the trailer 104. In one aspect, the accelerometer 108 can be operably coupled to the processor 133 and/or memory 134 to facilitate gross weight of the trailer 104, as described above. The accelerometer 108 can be in any suitable location, such as located on or otherwise associated with the load measuring hitch assembly 101 (e.g., the body portion 160, the ball portion 120, etc.), the tow vehicle 103 (e.g., an add-on or existing sensor of the tow vehicle), or the trailer 104. In some examples, the load measuring hitch assembly 101 can include the accelerometer 108.

The memory 134 can be of any suitable type, such as random-access memory (RAM), read only memory (ROM), flash memory, a solid-state drive, a memory card, a hard drive, an optical disk, a floppy disk, a magnetic tape, or any other memory components. The memory 134 can store instructions. The processor 133 can be operably coupled to the memory 134. In some examples, the processor 133 can execute the instructions to cause the processor 133 to receive force data generated by the transducer 132. The processor 133 can execute the instructions to cause the processor 133 to determine a magnitude of at least one of a vertical force 151a or a horizontal force 151b acting on the hitch ball 107 (e.g., through the trailer interface with the ball 138) based on the force data. The magnitude of the vertical force 151a may represent the tongue weight of the trailer 104. If the magnitude of the horizontal force 151b is determined, the processor 133 can also execute the instructions to cause the processor 133 to receive acceleration data generated by the accelerometer 108. The processor 133 can execute the instructions to cause the processor 133 to determine a magnitude of an acceleration in the horizontal direction 152b based on the acceleration data. The processor 133 can further execute the instructions to cause the processor 133 to determine a gross mass of the trailer 104 by dividing the magnitude of the force 151b by the magnitude of the acceleration in the horizontal direction 152b. Additionally, the processor 133 can execute the instructions to cause the processor 133 to determine a gross weight of the trailer 104 by multiplying the gross mass of the trailer 104 by the acceleration due to gravity (which may be an assumed typical value stored in the memory 134).

The term "executable" can mean a program file that is in a form that can be executed by the processor 133. For example, a program in a higher-level language can be compiled into machine code in a format that can be loaded into a random-access portion of the memory 134 and executed by the processor 133, or source code can be loaded by another executable program and interpreted to generate instructions in a random-access portion of the memory 134 to be executed by processor 133. The executable program can be stored in any portion or component of the memory 134.

In accordance with one embodiment of the present invention, a computer implemented method is disclosed for determining a tongue weight of a trailer and/or a gross weight of the trailer. The method can comprise receiving force data generated by the transducer 132. The method can also comprise determining a magnitude of at least one of a vertical force 151a or a horizontal force 151b acting on the hitch ball 107 (e.g., through the trailer interface with the ball 138) based on the force data. The magnitude of the vertical force 151a may represent the tongue weight of the trailer 104. If the magnitude of the horizontal force 151b is determined, the method can comprise receiving acceleration data generated by the accelerometer 108. The method can further comprise determining a magnitude of an acceleration in the horizontal direction 152b based on the acceleration data. The method can also comprise determining a gross mass of the trailer 104 by dividing the magnitude of the force 151b by the magnitude of the acceleration in the horizontal direction 152b. Additionally, the method can comprise determining a gross weight of the trailer 104 by multiplying the gross mass of the trailer 104 by the acceleration due to gravity (which may be an assumed typical value). It is noted that no specific order is required in this method, though generally in some embodiments, at least some of these method steps can be carried out sequentially or concurrently.

In one aspect, the load measuring hitch assembly 101 can include a display 140 for displaying or otherwise indicating force or load information obtained by the load measurement device 130. For example, the display 140 can be configured to indicate the magnitude of the force 151a, 151b (e.g., as vertical and horizontal force magnitude components and/or as a total force magnitude), as determined by the load measurement device 130. Thus, the display 140 can be an analog and/or digital display of a sensor or load cell (e.g., a strain gauge load cell) located local to the load measuring hitch assembly 101 and/or a separate display device distinct from the load measuring hitch assembly 101 (e.g., a remote display associated with the tow vehicle and/or a mobile electronic device). The display 140 can be wired and/or wirelessly connected to the load measurement device 130. Thus, in one example, the load measuring hitch assembly 101 can include a wireless transmitter 142, as described herein, to wirelessly transmit force measurements to the display 140.

The display 140 can be any suitable type of display, such as an analog or a digital display. The display 140 can be coupled to the load measurement device 130 in any suitable manner such that the display can properly indicate the magnitude of the load on the hitch ball 107. In one aspect, the display can be electrically coupled to the load measurement device 130. The load measurement device 130 and/or the display 140 can therefore include any suitable electrical device that can facilitate the determination and/or display of the magnitude of the load on the hitch ball 107. For example, the load measurement device 130 and/or the display 140 can include a processor and/or memory to determine the magnitude of the load on the hitch ball 107. In one aspect, a mobile device, such as a smartphone or a tablet, can include a processor and/or memory used to determine the magnitude of the load on the hitch ball 107, such as by executing an application. In another aspect, the display 140 can be calibrated to indicate the magnitude of the load on the hitch ball 107, based on electrical input from the load measurement device 130. In a particular aspect, therefore, the display 140 can be integral with the load measurement device 130 in determining the magnitude of the load on the hitch ball 107.

In some examples, the load measuring hitch assembly 101 can include a transmitter 142 such that load data pertaining to the magnitude of the force 151a, 151b on the hitch ball 107 can be wired or wirelessly transmitted to the display 140. In one aspect, the transmitter can transmit load data to a location remote from the load measuring hitch assembly 101, such as to a remote display 140. For example, the display 140 can be located inside the vehicle and can receive load data for display to the driver or operator of the vehicle. The transmission of load data can be via vehicle wiring, such as the taillight wiring, which can be utilized to communicate load data via a signal to the interior of the vehicle. In another aspect, a wireless transmission of load data can be accomplished via a Bluetooth connection, a cellular network, LAN, WIFI, an RF signal, an infrared signal, or any other suitable type of wireless network, connection, and/or protocol. In one aspect, the display 140 can comprise a screen of a mobile device, such as a smartphone or a tablet. Thus, the load data can be communicated to any suitable location, in or out of the vehicle. It should therefore be recognized that the display 140 can be disposed in any suitable location and can be in communication with the load measurement device 130 via any suitable means. In one aspect, the load measurement device 130, the display 140, and/or the transmitter 142, or any other related item or device, such as a processor, memory, a battery, or an RF receiver, can be located in or on the load measuring hitch assembly 101. In some examples, an optional, additional display 140' can be associated with any suitable structure of the load measuring hitch assembly 101, such as the ball portion 120 or the body portion 160, as shown in FIG. 1.

A method of measuring loads applied by a trailer on a tow vehicle can comprise operably coupling a load measuring hitch assembly as disclosed herein (e.g., the load measuring hitch assembly 101) to a tow vehicle. The method can also include engaging a coupling device of a trailer with the load measuring hitch assembly.

Although the trailer hitch system 100 includes what is generally referred to as a "hitch ball" throughout the present disclosure for coupling with a trailer, it should be recognized that the trailer hitch system can include any suitable form of coupling with a trailer, such as a lunette ring and pintle hook. Aspects of the present disclosure that facilitate measuring loads on the load measuring hitch assembly 101 applied by the trailer 104 as disclosed herein can be incorporated into such coupling arrangements.

The load measuring hitch assembly 101 of FIG. 1 has been shown and described as a generic representation of such an assembly. FIGS. 2A-5D include illustrations of various load measuring hitch assemblies that are more specific examples of the generic assembly 101 of FIG. 1. Thus, the description of the assembly 101 in FIG. 1 may describe aspects of the various assemblies of FIGS. 2A-5D, as applicable, which may not be described with particular reference to FIGS. 2A-5D. Furthermore, certain specific aspects and features described in one example may be present in another example, although not specifically discussed with reference to that example.

Figure 2A:
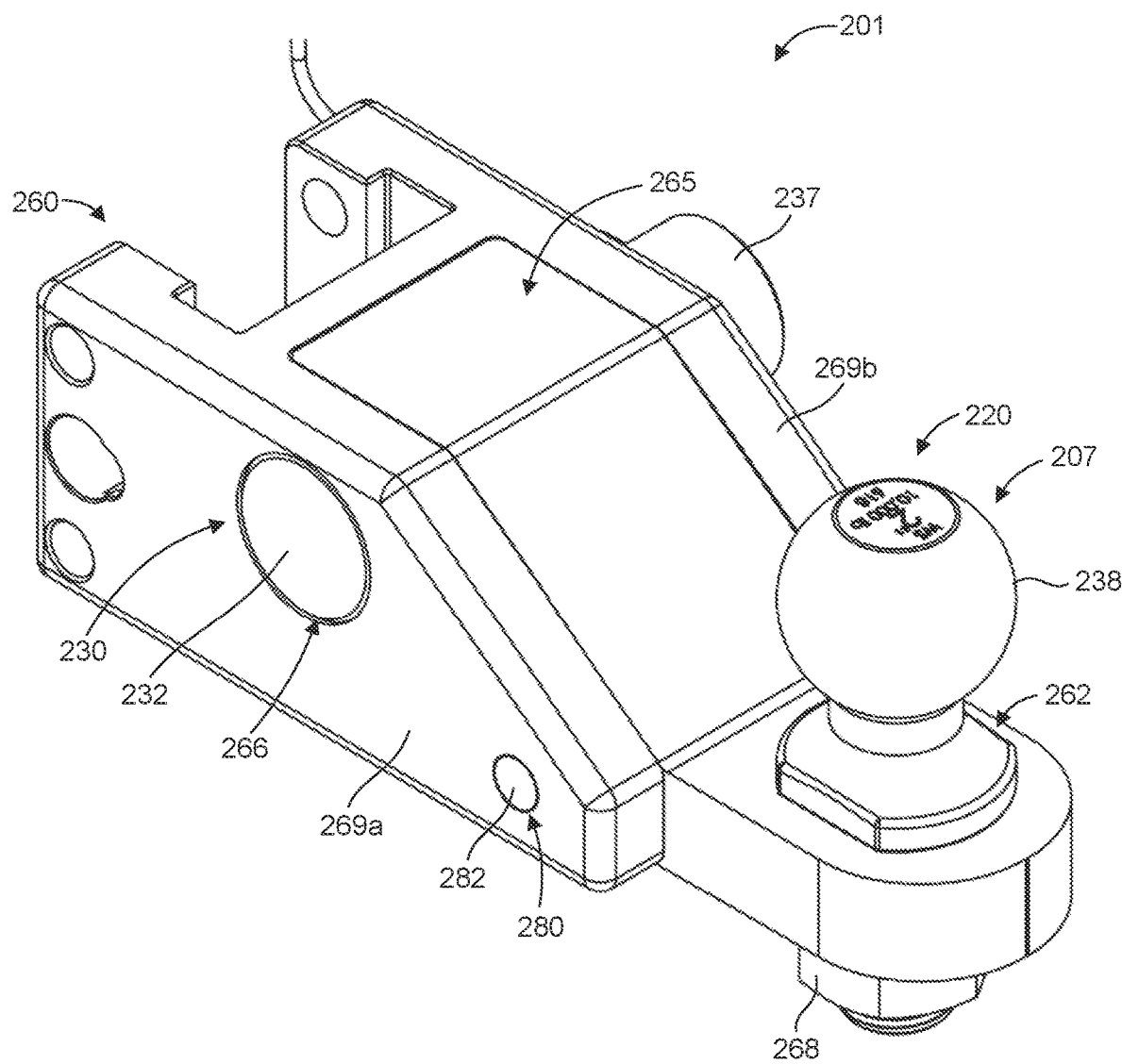
FIG. 2A illustrates a perspective view of a load measuring hitch assembly, in accordance with an example of the present disclosure.
Figure 2B:
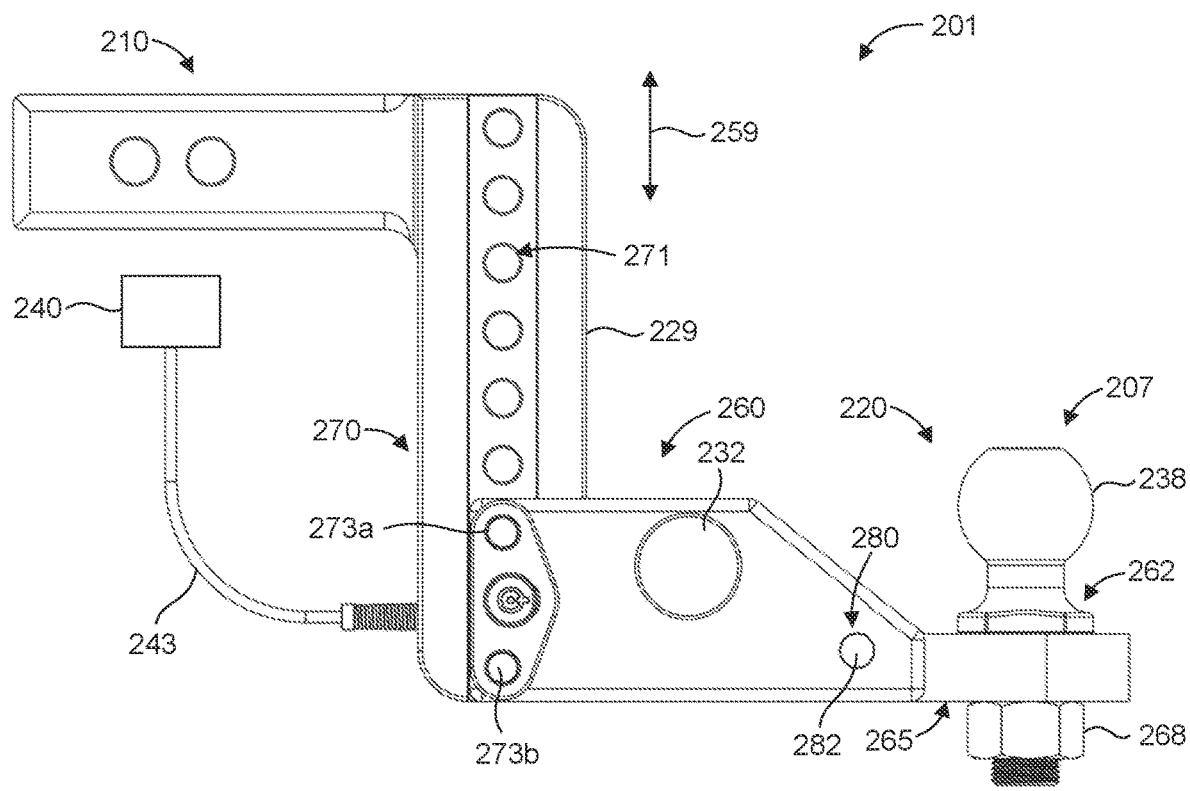
FIGS. 2B and 2C illustrate side views of the load measuring hitch assembly of FIG. 2A.
Figure 2C:
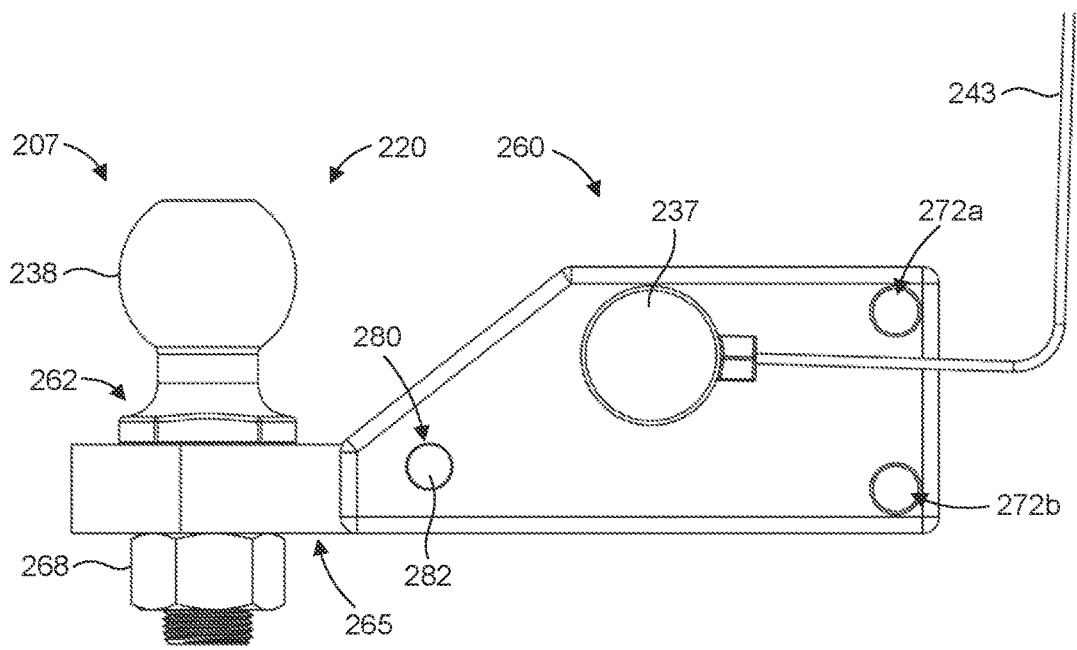
Figure 2D:
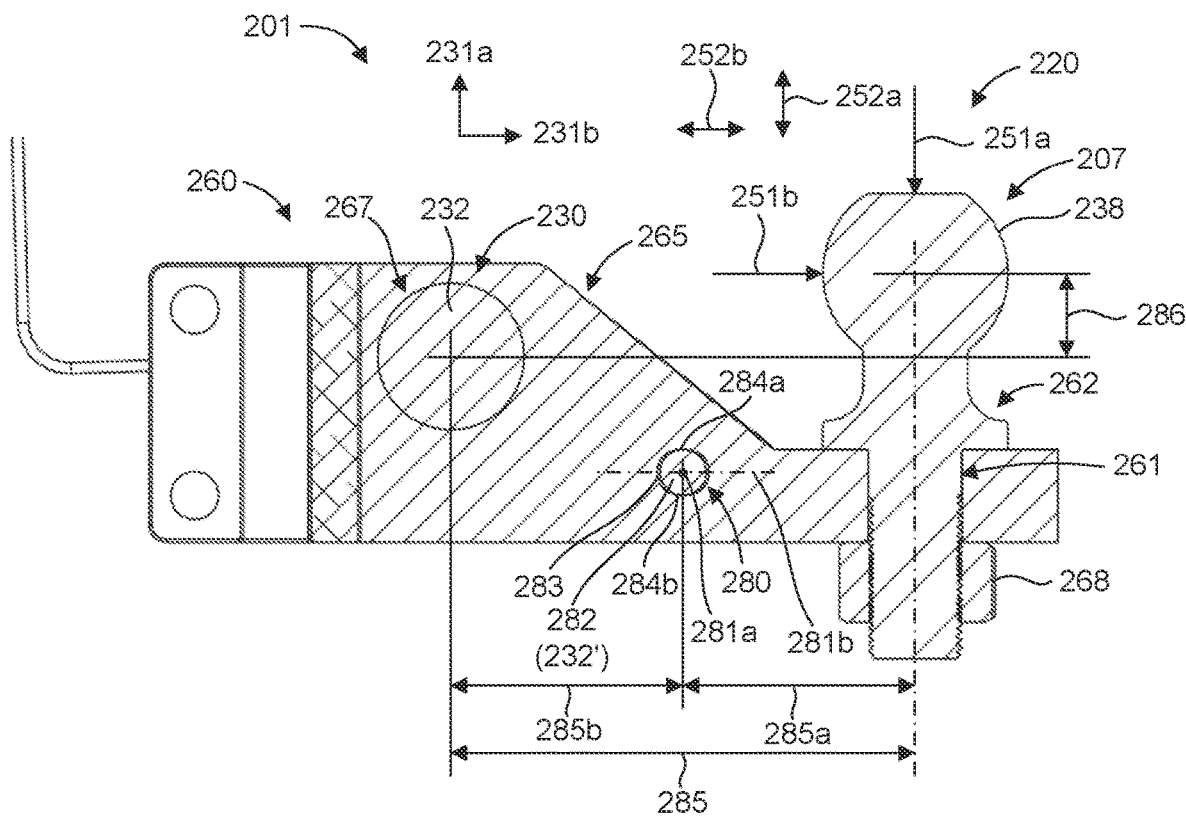
FIG. 2D illustrates a side cross-sectional view of the load measuring hitch assembly of FIG. 2A.

FIGS. 2A-2D illustrate a load measuring hitch assembly 201 in accordance with an example of the present disclosure. Specifically, FIG. 2A illustrates a perspective view of the load measuring hitch assembly 201, FIGS. 2B and 2C illustrate side views of the load measuring hitch assembly 201, and FIG. 2D illustrates a side cross-sectional view of the load measuring hitch assembly 201. The load measuring hitch assembly 201 can include a body portion 260 operable to facilitate coupling the load measuring hitch assembly 201 to a tow vehicle, a load measurement device 230 (e.g., a load cell, such as a strain gauge load cell configured as a load pin) operable to measure force in at least two measurement axes 231a, 231b (FIG. 2D), and a ball portion 220 having a hitch ball 207 (e.g., a ball 238) operable to facilitate coupling the load measuring hitch assembly 201 to a trailer. The load measurement device 230 can be operably associated with the body portion 260 and the ball portion 220 to determine a magnitude of a force 251a, 251b acting on the hitch ball 207 (e.g., through the trailer interface with a ball 238) in at least one of the two directions 252a, 252b. For example, the ball portion 220 and the body portion 260 can be coupled to one another via the load measurement device 230 (e.g., a load cell) and a pin slot joint 280. The pin slot joint 280 can comprise a pin 282 and a slot 283 (FIG. 2D). The pin slot joint 280 can provide relative motion between the ball portion 220 and the body portion 260 in a rotational degree of freedom about an axis 281a (out of the page) and a translational degree of freedom along an axis 281b. In the illustrated example, the axis 281b is horizontally oriented. The axes 281a, 281b can be orthogonal to one another. The rotational and translational degrees of freedom between the ball portion 220 and the body portion 260 can facilitate transfer of a force to the load measurement device 230 in the measurement axes 231a, 231b, thereby facilitating determining a magnitude of at least one of the vertical force 251a or the horizontal force 251b acting on the ball 207 (e.g., the ball 238).

In one aspect, the ball portion 220 can include a hitch ball support 265. The hitch ball support 265 can include or define a hitch ball opening or socket 261 that can receive a lower portion 262 of the hitch ball 207 and facilitate coupling the hitch ball 207 to the hitch ball support 265. In the illustrated example, the hitch ball opening 261 can be a through-hole and the lower portion 262 of the hitch ball 207 can be threaded to facilitate coupling with a fastener 268, such as a nut. In one aspect, the hitch ball 207 can be interchanged with another hitch ball having a different diameter ball 238 to properly fit a trailer tongue or to replace a damaged hitch ball. In some examples, the ball 238 can be removable from the lower portion 262 of the hitch ball 207 to facilitate removing or replacing only the ball 238 instead of the entire hitch ball 207.

The body portion 260 and the hitch ball support 265 can have any suitable configuration to facilitate support of the hitch ball support 265 by the body portion 260 via the load measurement device 230 (e.g., a load cell) and the pin slot joint 280. In the illustrated example, the body portion 260 can have a U-shaped end at least partially defined by side supports 269a, 269b. The hitch ball support 265 can be configured to fit within the U-shaped end between the side supports 269a, 269b. The body portion 260 and the hitch ball support 265 can be coupled to one another by the load measurement device 230 (e.g., a load cell) and the pin slot joint 280. The body portion 260 and the hitch ball support 265 are maintained separated from one another by the load measurement device 230 (e.g., a load cell) and the pin slot joint 280 to ensure that the body portion 260 and the hitch ball support 265 do not contact one another during use and interfere with the ability of the load measurement device 230 to accurately measure the force 215a, 251b applied to the ball 238.

The body portion 260 and the hitch ball support 265 can be configured to interface with the load measurement device 230. For example, the load measurement device 230 can comprise a load cell. The body portion 260 and the hitch ball support 265 can include or define respective load cell interfaces 266, 267. The load cell interfaces 266, 267 can have a sufficiently tight fit (e.g., a press fit, a location fit, an interference fit, a transition fit, etc.) with the load cell to minimize or avoid substantial relative movement between the load cell and the load cell interfaces 266, 267.

In one aspect, the hitch ball support 265 can form at least a portion of the pin slot joint 280. For example, the hitch ball support 265 can include or define the slot 283. The pin slot joint 280 can comprise a pin and a slot in any suitable arrangement with the body portion 260 and the hitch ball support 265. In the illustrated example, the pin 282 can be associated with the body portion 260 (e.g., affixed to the side supports 269a, 269b) and the slot 283 can be associated with (e.g., formed in) the hitch ball support 265. On the other hand, the pin 282 can be associated with (e.g., affixed to) the hitch ball support 265 and the slot 283 can be associated with the body portion 260 (e.g., formed in the side supports 269a, 269b). The pin 282 can have any suitable configuration, shape, or geometry to provide the functionality with the slot 283 described herein for a pin slot joint. For example, as illustrated in the figures, the pin 282 can have a cylindrical configuration. Similarly, the slot 283 can have any suitable configuration, shape, or geometry to provide the functionality with the pin 282 described herein for a pin slot joint. For example, the slot 283 can have an oval configuration, an oblong configuration, a rectangular configuration, etc., or any other slot configuration having parallel or approximately parallel sidewalls 284a, 284b over a translational range of motion of the pin 282 within the slot 283.

With particular reference to FIG. 2D, it can be observed that the ball 238 and the load measurement device 230 (e.g., the load cell or transducer 232) may be spatially separated from one another in the vertical and horizontal directions 252a, 252b by distances 286, 285, respectively. The use of the pin slot joint 280 in combination with the load measurement device 230 to couple the ball portion 220 (e.g., the hitch ball support 265) and the body portion 260 to one another can enable the load measurement device 230 to sense the force transferred from the hitch ball 207 to the load measurement device 230 (e.g., the load cell or transducer 232) in the measurement axes 231a, 231b. More specifically, the two degrees of freedom (e.g., about the axis 281a and along the axis 281b) provided by the pin slot joint 280 can facilitate an unconstrained transfer of the force 251a, 251b applied to the ball 238 to the load measurement device 230 (e.g., the load cell or transducer 232), which can be sensed as force components in the measurement axes 231a, 231b. In general, therefore, the measured force components in the measurement axes 231a, 231b can be related to the force 251a, 251b acting on the hitch ball 207 based on known geometry and engineering principles to determine the magnitudes of the vertical force 251a and the horizontal force 251b.

In some examples, the geometry and relationships between the ball 238, the pin slot joint 280, and the load measurement device 230 (e.g., the load cell or transducer 232) can be selected to simplify at least some of the calculations required to determine the vertical force 251a and/or the horizontal force 251b. In the illustrated example, the measurement axes 231a, 231b can be oriented parallel to the respective vertical and horizontal directions 252a, 252b, and the translational degree of freedom along the axis 281b can be oriented parallel to the horizontal direction 251b. In one aspect, the load cell or transducer 232 can be located vertically and horizontally offset from the ball 238. The pin slot joint 280 can be (horizontally) located between the load cell or transducer 232 and the ball 238. The ball 238 can be located horizontally offset from the pin slot joint 280 by a distance 285a. The load cell or transducer 232 can be located horizontally offset from the pin slot joint 280 by a distance 285b. Thus, the vertical force 251a can cause the ball portion 220 (e.g., the hitch ball support 265) to rotate about the axis 281a of the pivot slot joint 280 and exert a force on the load cell or transducer 232 in the vertical direction 252a. In some examples, the distances 285a, 285b can be substantially equal, which can simplify the calculations to determine the magnitude of the vertical force 251a. In some examples, the load measurement device 230 can be calibrated to correctly indicate the force 251a, 251b acting on the hitch ball 207.

Figure 2E:
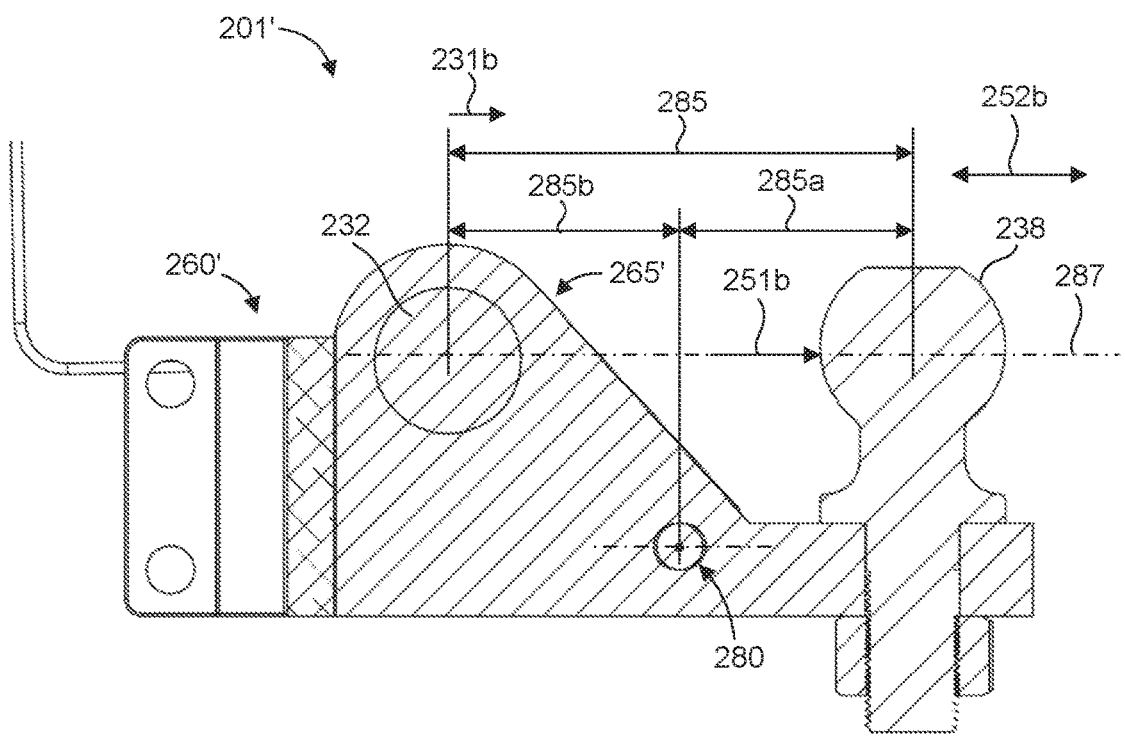
FIG. 2E illustrates a side cross-sectional view of a load measuring hitch assembly, in accordance with example of the present disclosure.

In the FIG. 2D example, the ball 238 and the load measurement device 230 (e.g., the load cell or transducer 232) are separated from one another in the vertical direction 252a, by the distance 286. In one aspect, the vertical relationship of the ball 238 and the load measurement device 230 (e.g., the load cell or transducer 232) can be configured to simplify the calculations necessary to determine the horizontal force 251b. For example, FIG. 2E illustrates a load measuring hitch assembly 201' that is similar to the load measuring hitch assembly 201 discussed above. In this case, the load measuring hitch assembly 201' includes a body portion 260' and a hitch ball support 265' configured to locate the ball 238 and the load cell or transducer 232 at the same vertical height (e.g., in the same horizontal plane 287). In other words, there is no vertical offset between the ball 238 and the load cell or transducer 232. The force applied to the load cell or transducer 232 due to the horizontal force 251b will therefore have a component in only the direction 252b, which can simplify the calculations to determine the magnitude of the horizontal force 251b.

Although the pin slot joint 280 is illustrated as horizontally located between the load cell or transducer 232 and the ball 238, it should be recognized that the load cell or transducer 232, the ball 238, and the pin slot joint 280 can have any suitable vertical and horizontal position relative to one another. For example, the load cell or transducer 232 can be horizontally located between the pin slot joint 280 and the ball 238.

In some examples, the pin 282 can be configured as a load cell or transducer 232' (FIG. 2D) that functions as part of the load measurement device 230. In the illustrated example, the slot 283 is configured to provide a translational degree of freedom along a horizontally oriented axis 281b. Thus, the load cell or transducer 232' can measure force in the measurement axis 231a, which can be parallel to the vertical direction 252a and therefore used to determine the magnitude of the vertical force 251a. The load cell or transducer 232 can be configured to measure force in the measurement axis 231b, which can be parallel to the horizontal direction 252b and therefore used to determine the magnitude of the horizontal force 251b. The load cell or transducer 232, 232' configurations described above can isolate vertical and horizontal loads to a given load cell or transducer 232, 232', which can each be configured to measure or sense force in only a single axis or direction. Thus, the load cells or transducers 232, 232' can each individually be used to determine a magnitude of a vertical or a horizontal force.

In one aspect, a display 240 can be included to indicate the magnitude of the force acting on the hitch ball 207. It should be recognized that a display can be disposed in any suitable location. For example, such a display can be located proximate the load measurement device 230 remotely located relative to the load measurement device 230. As shown in FIG. 2B, the display 240 can be located at a distance from the body portion 260 and operably connected to the load measurement device 230 by a wire or cable 243. In some examples, various components of a load measurement device or other components for determining the magnitude of the force on the ball (e.g., a processor, a memory, a power source, and/or an accelerometer), as discussed above, can be located on or in the hitch ball support 265 and/or the body portion 260, such as in a protective housing 237 (FIGS. 2A and 2C). In some examples, various components of a load measurement device or other components for determining the magnitude of the force on the ball (e.g., a processor, a memory, a power source, and/or an accelerometer), as discussed above, can be located on or with the display 240.

In one aspect, the body portion 260 can be removably coupleable to a hitch portion 210 (FIG. 2B). For example, the hitch portion 210 can include a vertical member 229 and the body portion 260 can be configured to interface with the vertical member 229. In one aspect, the vertical member 229 and the body portion 260 can be configured with complementary geometries to facilitate a stable engagement of the vertical member 229 and the body portion 260 when coupled to one another, such as via coupling pins 273a, 273b in coupling pin openings 272a, 272b (FIG. 2C) in the body portion 260 and openings 271 in the vertical member 229. In one example, the vertical member 229 can have an I-shaped cross-section and the body portion 260 can have a C-shaped cross-sectional portion (FIG. 2A) to mate with and engage at least a portion of the I-shaped cross-section of the vertical member 229. Such an interface configuration can provide torsional stability for mating the vertical member 229 and the body portion 260 components of the assembly 201. In one aspect, the coupling pins 273a, 273b can be coupled to one another via a connecting member 274 to facilitate simultaneous insertion or removal of the coupling pins 273a, 273b. The ability to removably couple the body portion 260 to the hitch portion 210 can enable swapping out hitch balls or incorporating the force measuring features disclosed herein with another hitch design.

In one aspect, the present example also includes features and structures that facilitate a vertical height adjustment of the hitch ball 207. These features can be used, for example, to position the hitch ball 207 at a suitable height for engaging a trailer when a hitch receiver on the tow vehicle would otherwise be too high. In particular, the vertical member 229 can be configured to allow adjustment of a height of the hitch ball 207 with respect to the hitch portion 210 in direction 259 by having an elongated length in direction 259 and multiple openings 271 along the length. In use, the coupling pins 273a, 273b can be removed from at least the openings 271 in the vertical member 229, and the body portion 260 can be moved vertically in direction 259. Once a desired height of the hitch ball 207 is achieved, the coupling pins 273a, 273b can be inserted into the nearest acceptable adjustment openings 271 through the respective coupling pin openings 272a, 272b to fix the relative position of the body portion 260 and the vertical member 229 and complete the height adjustment of the hitch ball 207.

Figure 3A:
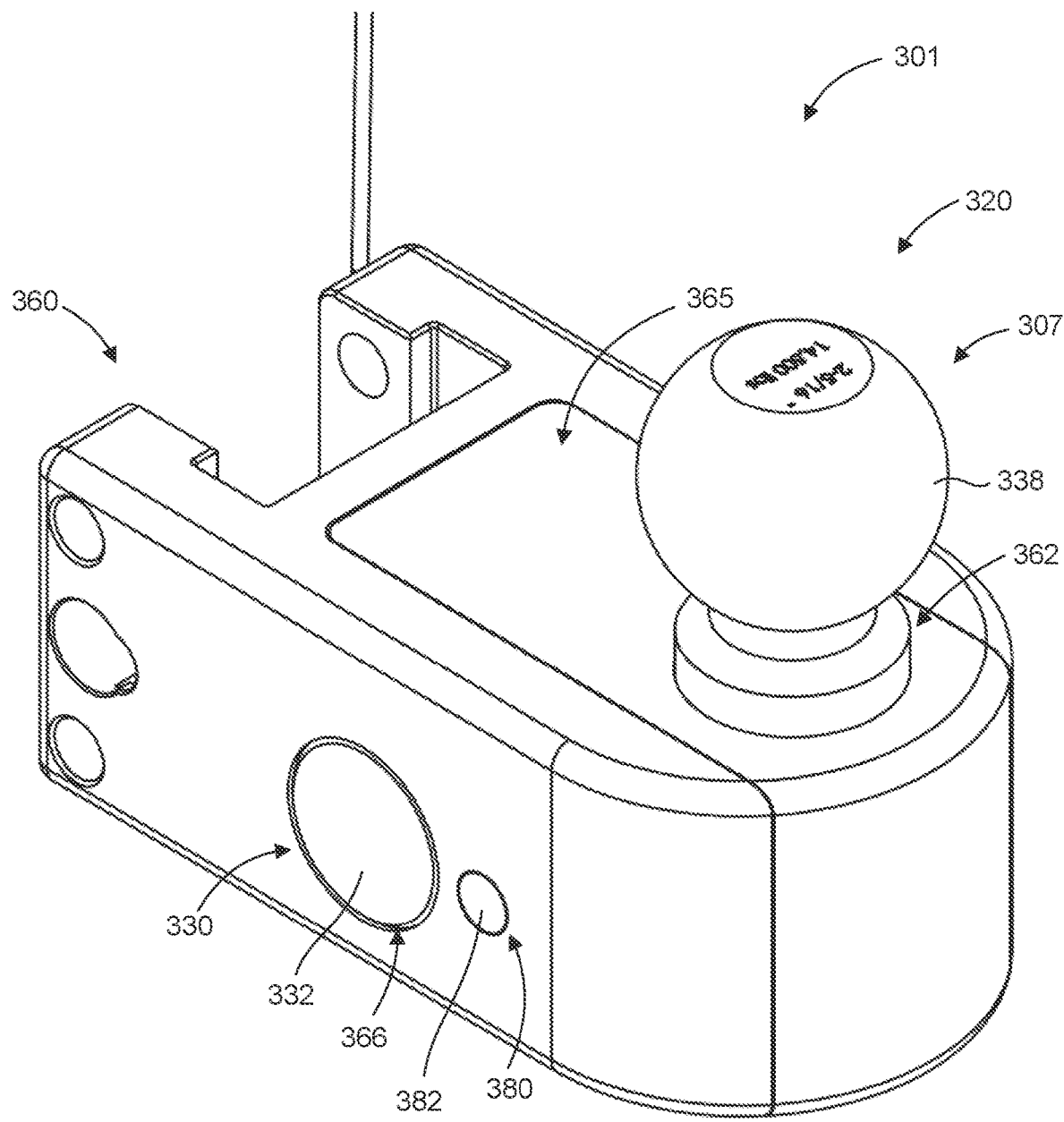
FIGS. 3A and 3B illustrate perspective views of a load measuring hitch assembly, in accordance with an example of the present disclosure.
Figure 3B:
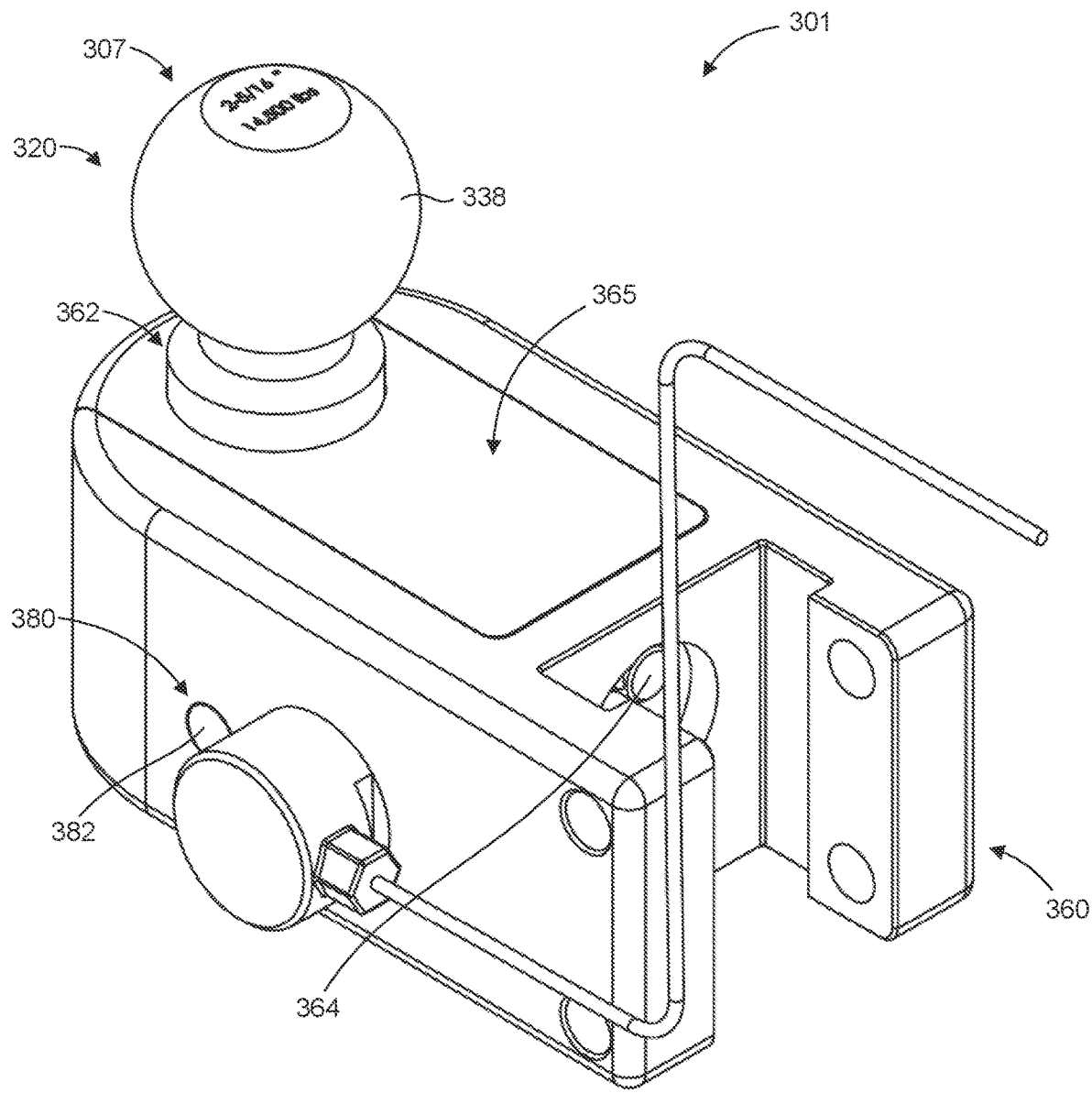
Figure 3C:
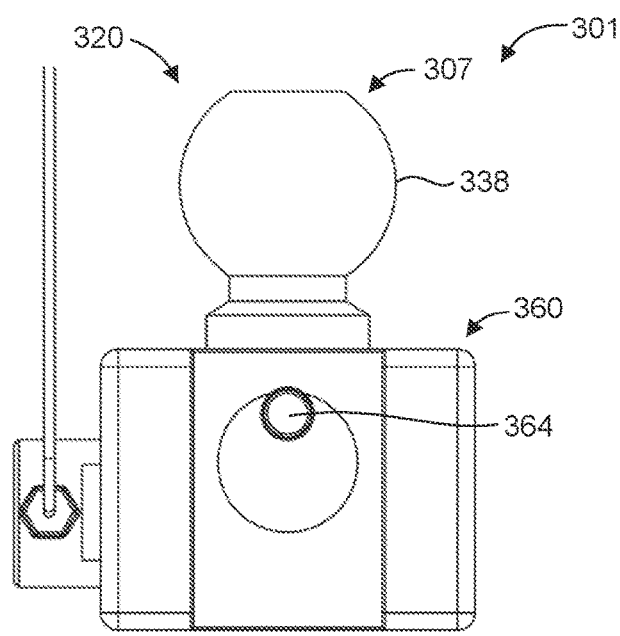
FIG. 3C illustrates an end view of the load measuring hitch assembly of FIGS. 3A and 3B.
Figure 3D:
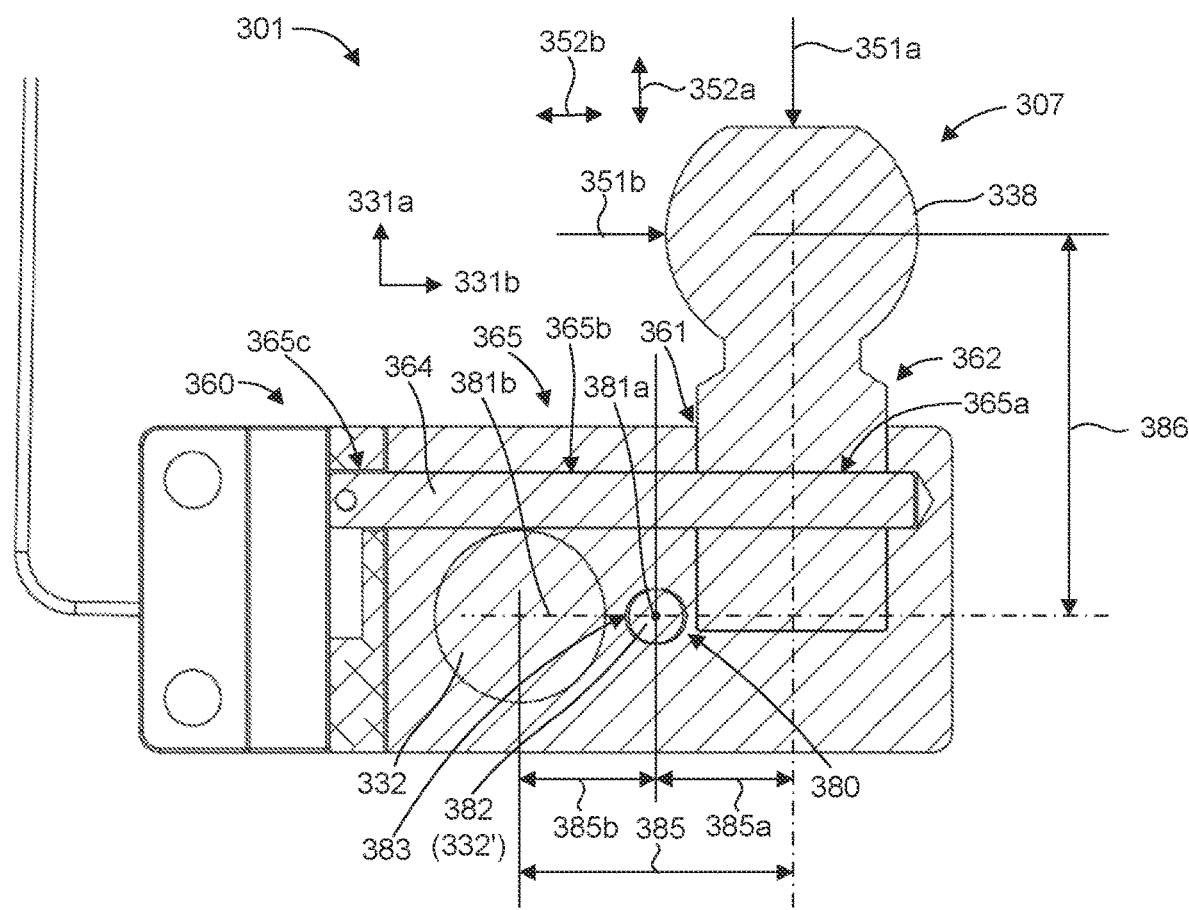
FIG. 3D illustrates a side cross-sectional view of the load measuring hitch assembly of FIGS. 3A and 3B.

FIGS. 3A-3D illustrate a load measuring hitch assembly 301 in accordance with an example of the present disclosure. Specifically, FIGS. 3A and 3B illustrate perspective views of the load measuring hitch assembly 301, FIG. 3C illustrates an end view of the load measuring hitch assembly 301, and FIG. 3D illustrates a side cross-sectional view of the load measuring hitch assembly 301. The load measuring hitch assembly 301 can include a body portion 360 operable to facilitate coupling the load measuring hitch assembly 301 to a tow vehicle, a load measurement device 330 (e.g., a load cell, such as a strain gauge load cell configured as a load pin) operable to measure force in at least two measurement axes 331a, 331b (FIG. 3D), and a ball portion 320 having a hitch ball 307 (e.g., a ball 338) operable to facilitate coupling the load measuring hitch assembly 301 to a trailer. The load measurement device 330 can be operably associated with the body portion 360 and the ball portion 320 to determine a magnitude of a force 351a, 351b acting on the hitch ball 307 (e.g., through the trailer interface with a ball 338) in at least one of the two directions 352a, 352b. For example, the ball portion 320 and the body portion 360 can be coupled to one another via the load measurement device 330 (e.g., a load cell) and a pin slot joint 380. The pin slot joint 380 can comprise a pin 382 and a slot 383 (FIG. 3D). The pin slot joint 380 can provide relative motion between the ball portion 320 and the body portion 360 in a rotational degree of freedom about an axis 381a (out of the page) and a translational degree of freedom along an axis 381b. In the illustrated example, the axis 381b is horizontally oriented. The axes 381a, 381b can be orthogonal to one another. The rotational and translational degrees of freedom between the ball portion 320 and the body portion 360 can facilitate transfer of a force to the load measurement device 330 in the measurement axes 331a, 331b, thereby facilitating determining a magnitude of at least one of the vertical force 351a or the horizontal force 351b acting on the ball 307 (e.g., the ball 338).

In one aspect, the ball portion 320 can include a hitch ball support 365. The hitch ball support 365 can include or define a hitch ball opening or socket 361 that can receive a lower portion 362 of the hitch ball 307 and facilitate coupling the hitch ball 307 to the hitch ball support 365. In the illustrated example, the hitch ball opening 361 can be a blind-hole and the lower portion 362 of the hitch ball 307 can be secured to hitch ball support 365 with a retention pin 364. In one aspect, the hitch ball 307 and the hitch ball support 365 can have respective retention pin openings 365a, 365b operable to receive the retention pin 364. In some examples, the body portion 360 can have a retention pin opening 365c that allows access for the retention pin 364 to the retention pin openings 365a, 365b. The retention pin opening 365c can be sized with enough clearance about the retention pin 364 to allow unhindered relative movement between the hitch ball support 365 and the body portion 360 during use.

The body portion 360 and the hitch ball support 365 can be configured to interface with the load measurement device 330. For example, the load measurement device 330 can comprise a load cell. The body portion 360 and the hitch ball support 365 can include or define respective load cell interfaces 366, 367. In one aspect, the hitch ball support 365 can form at least a portion of the pin slot joint 380. For example, the hitch ball support 365 can include or define the slot 383.

With particular reference to FIG. 3D, it can be observed that the ball 338 and the load measurement device 330 (e.g., the load cell or transducer 332) may be spatially separated from one another in the vertical and horizontal directions 352a, 352b by distances 386, 385, respectively. The use of the pin slot joint 380 in combination with the load measurement device 330 to couple the ball portion 320 (e.g., the hitch ball support 365) and the body portion 360 to one another can enable the load measurement device 330 to sense the force transferred from the hitch ball 307 to the load measurement device 330 (e.g., the load cell or transducer 332) in the measurement axes 331a, 331b. More specifically, the two degrees of freedom (e.g., about the axis 381a and along the axis 381b) provided by the pin slot joint 380 can facilitate an unconstrained transfer of the force 351a, 351b applied to the ball 338 to the load measurement device 330 (e.g., the load cell or transducer 332), which can be sensed as force components in the measurement axes 331a, 331b. In general, therefore, the measured force components in the measurement axes 331a, 331b can be related to the force 351a, 351b acting on the hitch ball 307 based on known geometry and engineering principles to determine the magnitudes of the vertical force 351a and the horizontal force 351b.

In some examples, the geometry and relationships between the ball 338, the pin slot joint 380, and the load measurement device 330 (e.g., the load cell or transducer 332) can be selected to simplify at least some of the calculations. In the illustrated example, the measurement axes 331a, 331b can be oriented parallel to the respective vertical and horizontal directions 352a, 352b, and the translational degree of freedom along the axis 381b can be oriented parallel to the horizontal direction 351b. In one aspect, the load cell or transducer 332 can be located vertically and horizontally offset from the ball 338. The pin slot joint 380 can be (horizontally) located between the load cell or transducer 332 and the ball 338. The ball 338 can be located horizontally offset from the pin slot joint 380 by a distance 385a. The load cell or transducer 332 can be located horizontally offset from the pin slot joint 380 by a distance 385b. Thus, the vertical force 351a can cause the ball portion 320 (e.g., the hitch ball support 365) to rotate about the axis 381a of the pivot slot joint 380 and exert a force on the load cell or transducer 332 in the vertical direction 352a. In some examples, the distances 385a, 385b can be substantially equal, which can simplify the calculations to determine the magnitude of the vertical force 351a. In some examples, the load measurement device 330 can be calibrated to correctly indicate the force 351a, 351b acting on the hitch ball 307.

In some examples, the pin 382 can be configured as a load cell or transducer 332' (FIG. 3D) that functions as part of the load measurement device 330. In the illustrated example, the slot 383 is configured to provide a translational degree of freedom along a horizontally oriented axis 381b. Thus, the load cell or transducer 332' can measure force in the measurement axis 331a, which can be parallel to the vertical direction 352a and therefore used to determine the magnitude of the vertical force 351a. The load cell or transducer 332 can be configured to measure force in the measurement axis 331b, which can be parallel to the horizontal direction 352b and therefore used to determine the magnitude of the horizontal force 351b. The load cell or transducer 332, 332' configurations described above can isolate vertical and horizontal loads to a given load cell or transducer 332, 332', which can each be configured to measure or sense force in only a single axis or direction. Thus, the load cells or transducers 332, 332' can each individually be used to determine a magnitude of a vertical or a horizontal force.

Figure 4A:
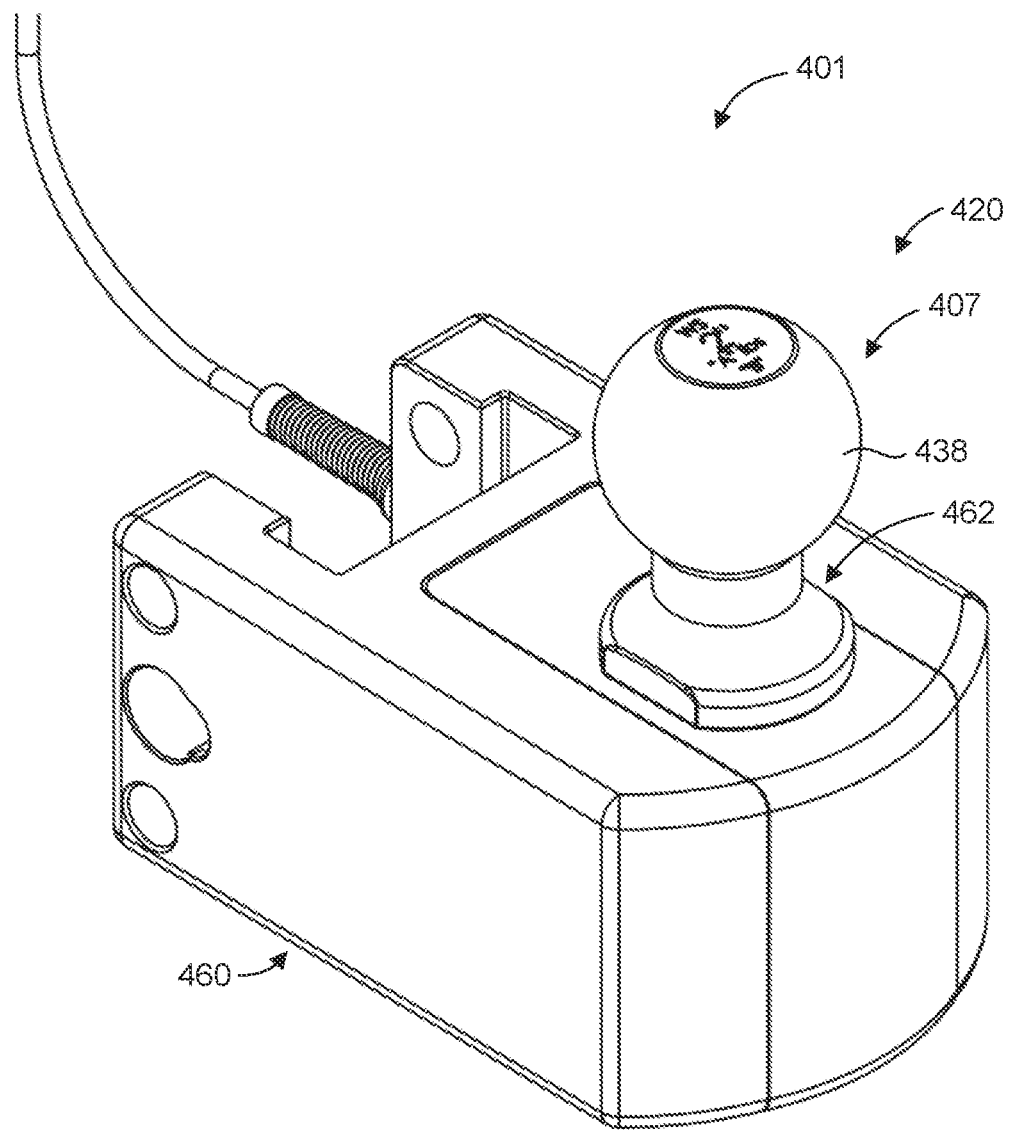
FIGS. 4A and 4B illustrate perspective views of a load measuring hitch assembly, in accordance with an example of the present disclosure.
Figure 4B:
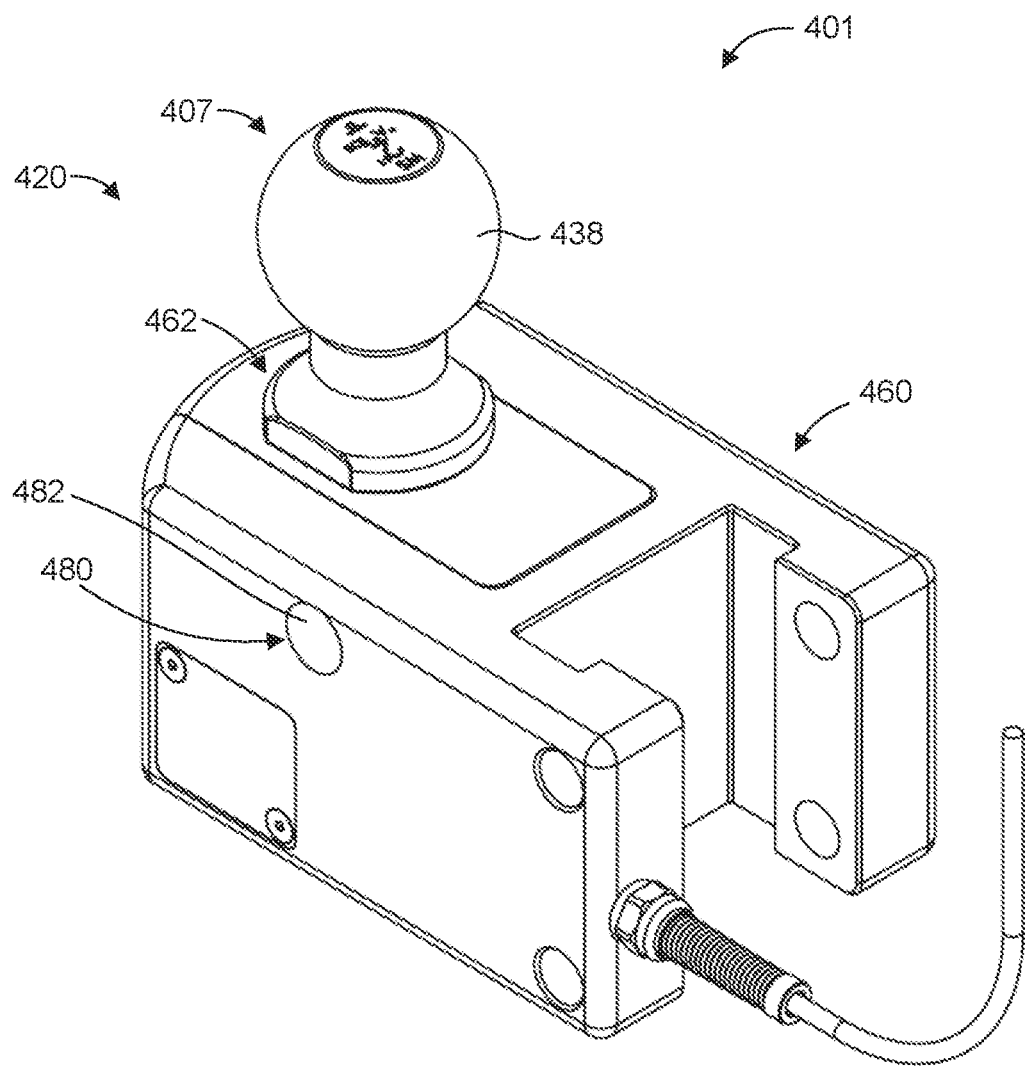
Figure 4C:
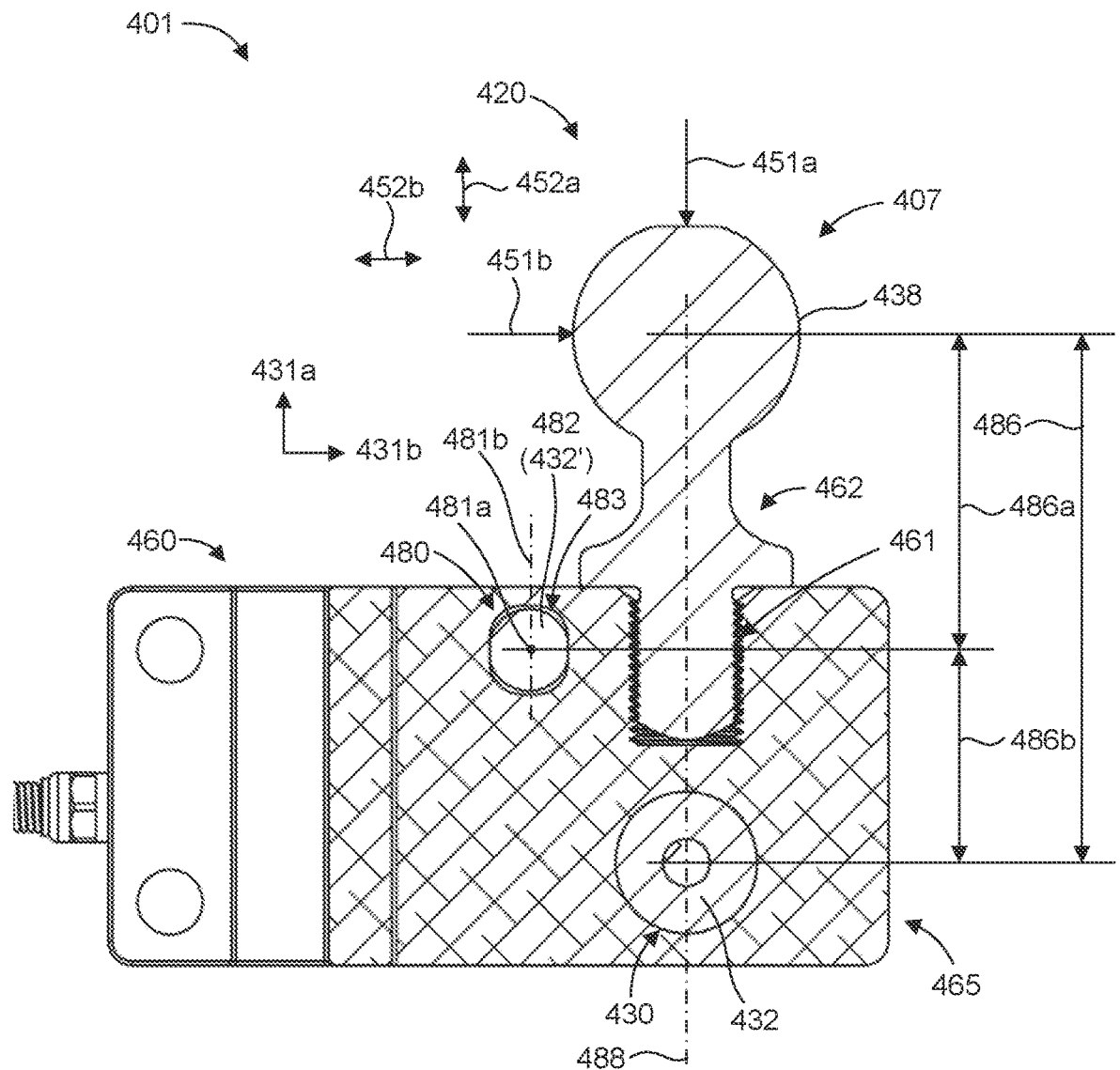
FIG. 4C illustrates a side cross-sectional view of the load measuring hitch assembly of FIGS. 4A and 4B.

FIGS. 4A-4C illustrate a load measuring hitch assembly 401 in accordance with an example of the present disclosure. Specifically, FIGS. 4A and 4B illustrate perspective views of the load measuring hitch assembly 401 and FIG. 4C illustrates a side cross-sectional view of the load measuring hitch assembly 401. The load measuring hitch assembly 401 can include a body portion 460 operable to facilitate coupling the load measuring hitch assembly 401 to a tow vehicle, a load measurement device 430 (e.g., a load cell, such as a strain gauge load cell configured as a load pin) operable to measure force in at least two measurement axes 431a, 431b (FIG. 4C), and a ball portion 420 having a hitch ball 407 (e.g., a ball 438) operable to facilitate coupling the load measuring hitch assembly 401 to a trailer. The load measurement device 430 can be operably associated with the body portion 460 and the ball portion 420 to determine a magnitude of a force 451a, 451b acting on the hitch ball 407 (e.g., through the trailer interface with a ball 438) in at least one of the two directions 452a, 452b. For example, the ball portion 420 and the body portion 460 can be coupled to one another via the load measurement device 430 (e.g., a load cell) and a pin slot joint 480. The pin slot joint 480 can comprise a pin 482 and a slot 483 (FIG. 4C). The pin slot joint 480 can provide relative motion between the ball portion 420 and the body portion 460 in a rotational degree of freedom about an axis 481a (out of the page) and a translational degree of freedom along an axis 481b. In the illustrated example, the axis 481b is vertically oriented. The axes 481a, 481b can be orthogonal to one another. The rotational and translational degrees of freedom between the ball portion 420 and the body portion 460 can facilitate transfer of a force to the load measurement device 430 in the measurement axes 431a, 431b, thereby facilitating determining a magnitude of at least one of the vertical force 451a or the horizontal force 451b acting on the ball 407 (e.g., the ball 438).

In one aspect, the ball portion 420 can include a hitch ball support 465. The hitch ball support 465 can include or define a hitch ball opening or socket 461 that can receive a lower portion 462 of the hitch ball 407 and facilitate coupling the hitch ball 407 to the hitch ball support 465. In the illustrated example, the hitch ball opening 461 can be a blind-hole at least partially defined by a threaded interface configured to engage a threaded interface of the lower portion 461 of the hitch ball 407.

The body portion 460 and the hitch ball support 465 can be configured to interface with the load measurement device 430. For example, the load measurement device 430 can comprise a load cell. The body portion 460 and the hitch ball support 465 can include or define respective load cell interfaces 466, 467. In one aspect, the hitch ball support 465 can form at least a portion of the pin slot joint 480. For example, the hitch ball support 465 can include or define the slot 483. In the illustrated example, the pin 482 has parallel flat surfaces configured to interface with flat surfaces of the slot 483 formed in the hitch ball support 465 (FIG. 4C). In this case, the pin 482 can rotate about the axis 481a relative to the body portion 460.

With particular reference to FIG. 4C, it can be observed that the ball 438 and the load measurement device 430 (e.g., the load cell or transducer 432) may be spatially separated from one another in the vertical direction 452 by a distance 486. The use of the pin slot joint 480 in combination with the load measurement device 430 to couple the ball portion 420 (e.g., the hitch ball support 465) and the body portion 460 to one another can enable the load measurement device 430 to sense the force transferred from the hitch ball 407 to the load measurement device 430 (e.g., the load cell or transducer 432) in the measurement axes 431a, 431b. More specifically, the two degrees of freedom (e.g., about the axis 481a and along the axis 481b) provided by the pin slot joint 480 can facilitate an unconstrained transfer of the force 451a, 451b applied to the ball 438 to the load measurement device 430 (e.g., the load cell or transducer 432), which can be sensed as force components in the measurement axes 431a, 431b. In general, therefore, the measured force components in the measurement axes 431a, 431b can be related to the force 451a, 451b acting on the hitch ball 407 based on known geometry and engineering principles to determine the magnitudes of the vertical force 451a and the horizontal force 451b.

In some examples, the geometry and relationships between the ball 438, the pin slot joint 480, and the load measurement device 430 (e.g., the load cell or transducer 432) can be selected to simplify at least some of the calculations. In the illustrated example, the measurement axes 431a, 431b can be oriented parallel to the respective vertical and horizontal directions 452a, 452b, and the translational degree of freedom along the axis 481b can be oriented parallel to the vertical direction 451a. In one aspect, the load cell or transducer 432 can be located vertically offset from the ball 438. In this case, the load cell or transducer 432 is located (directly) below the ball 438. The pin slot joint 480 can be (vertically) located between the load cell or transducer 432 and the ball 438. The ball 438 can be located vertically offset from the pin slot joint 480 by a distance 486a. The load cell or transducer 432 can be located vertically offset from the pin slot joint 480 by a distance 486b. Thus, the horizontal force 451b can cause the ball portion 420 (e.g., the hitch ball support 465) to rotate about the axis 481a of the pivot slot joint 480 and exert a force on the load cell or transducer 432 in the horizontal direction 452b. Although not illustrated as such, in some examples, the distances 486a, 486b can be substantially equal, which can simplify the calculations to determine the magnitude of the horizontal force 451b. In some examples, the load measurement device 430 can be calibrated to correctly indicate the force 451a, 451b acting on the hitch ball 407.

In one aspect, the horizontal relationship of the ball 438 and the load measurement device 430 (e.g., the load cell or transducer 432) can be configured to simplify the calculations necessary to determine the vertical force 451a. For example, the ball 438 and the load cell or transducer 432 can be located at the same horizontal position (e.g., in the same vertical plane 488). In other words, there is no horizontal offset between the ball 438 and the load cell or transducer 432. Because the axis 481b is vertically oriented (i.e., parallel to the vertical direction 451a), the force applied to the load cell or transducer 432 due to the vertical force 451a will therefore have a component in only the direction 452a, which can simplify the calculations to determine the magnitude of the vertical force 451a.

In some examples, the pin 482 can be configured as a load cell or transducer 432' (FIG. 4C) that functions as part of the load measurement device 430. In the illustrated example, the slot 483 is configured to provide a translational degree of freedom along a vertically oriented axis 481b. Thus, the load cell or transducer 432' can measure force in the measurement axis 431b, which can be parallel to the horizontal direction 452b and therefore used to determine the magnitude of the horizontal force 451b. The load cell or transducer 432 can be configured to measure force in the measurement axis 431a, which can be parallel to the vertical direction 452a and therefore used to determine the magnitude of the vertical force 451a. The load cell or transducer 432, 432' configurations described above can isolate vertical and horizontal loads to a given load cell or transducer 432, 432', which can each be configured to measure or sense force in only a single axis or direction. Thus, the load cells or transducers 432, 432' can each individually be used to determine a magnitude of a vertical or a horizontal force.

Figure 5A:
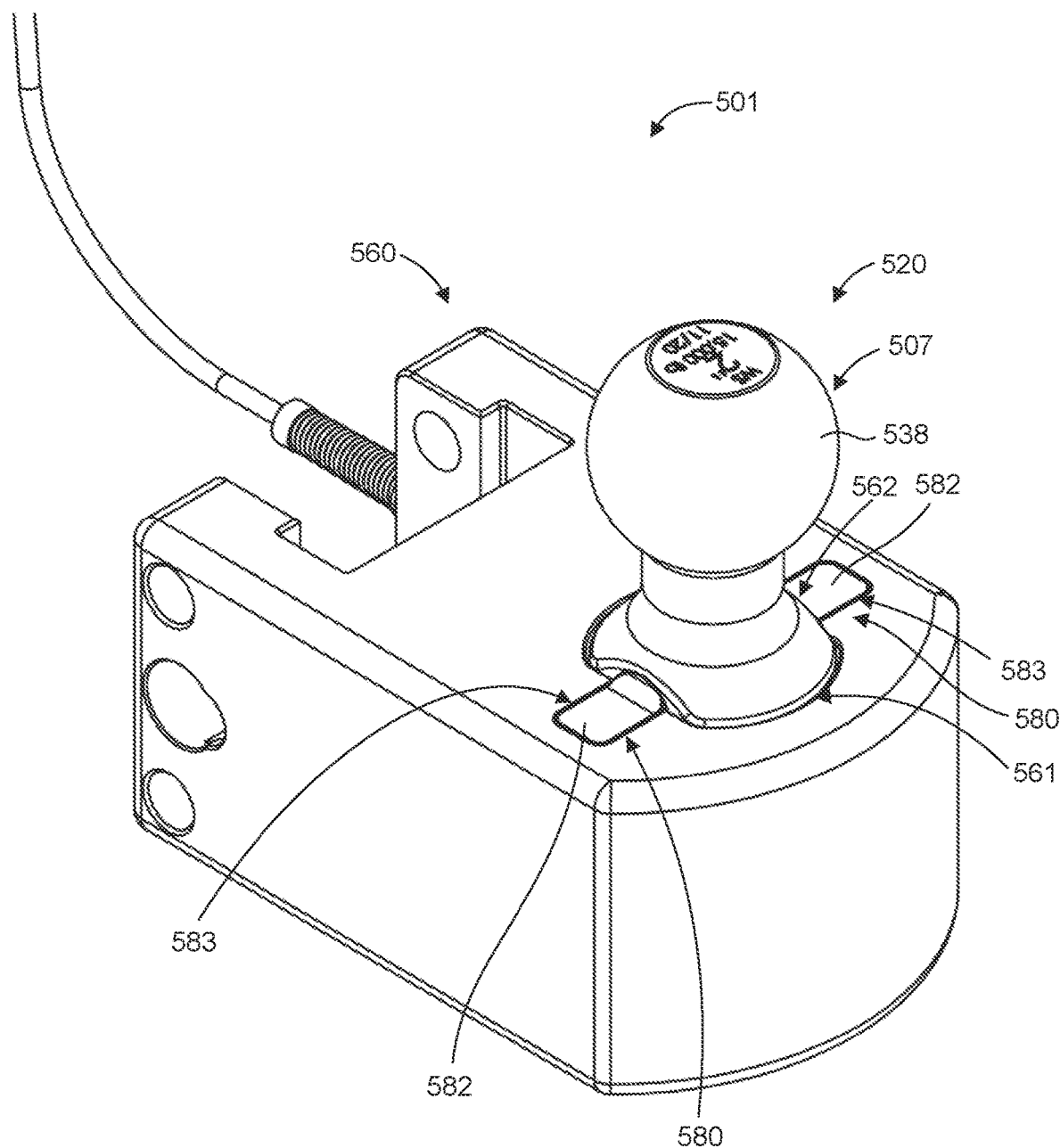
FIGS. 5A and 5B illustrate perspective views of a load measuring hitch assembly, in accordance with an example of the present disclosure.
Figure 5B:
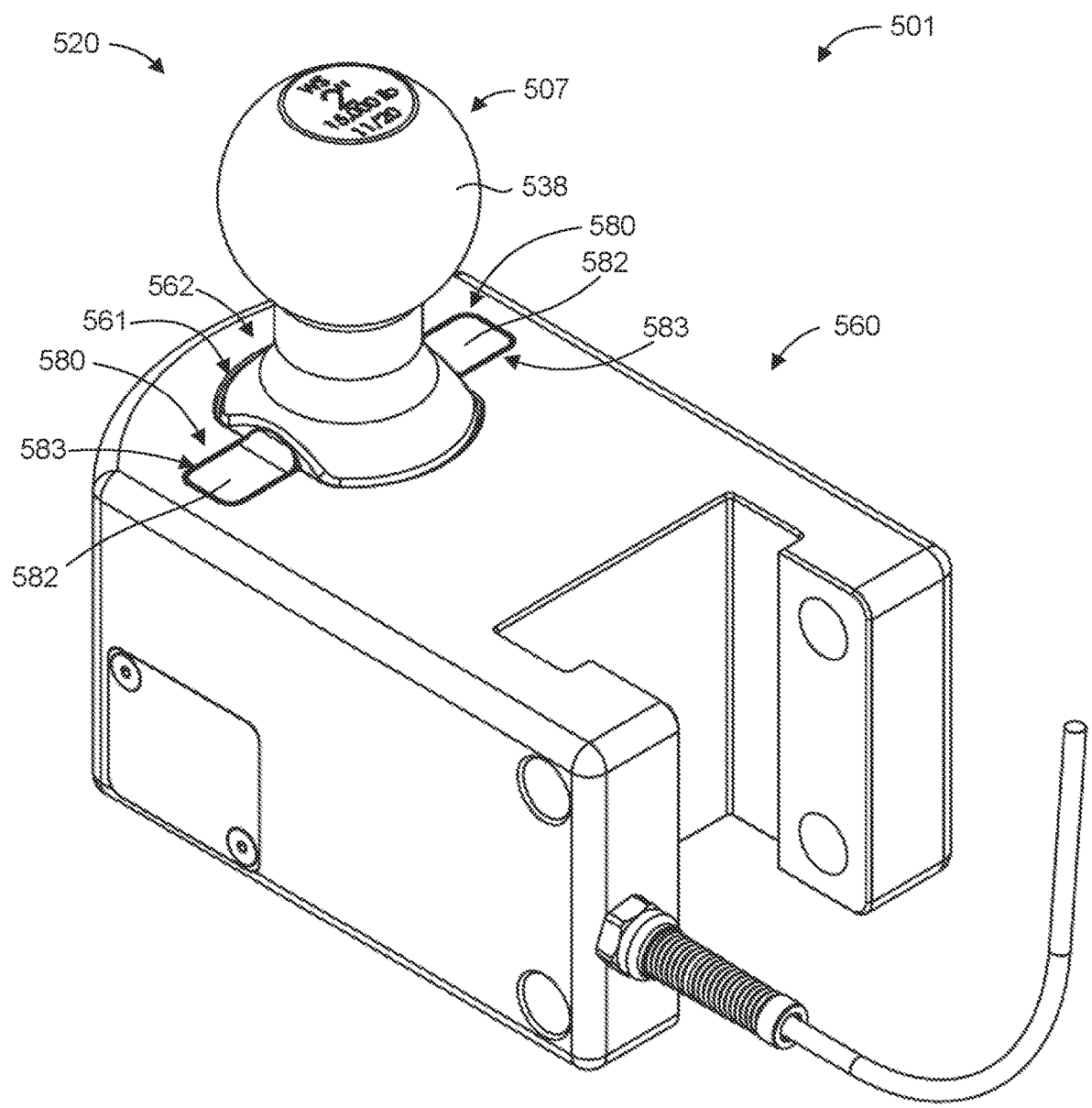
Figure 5C:
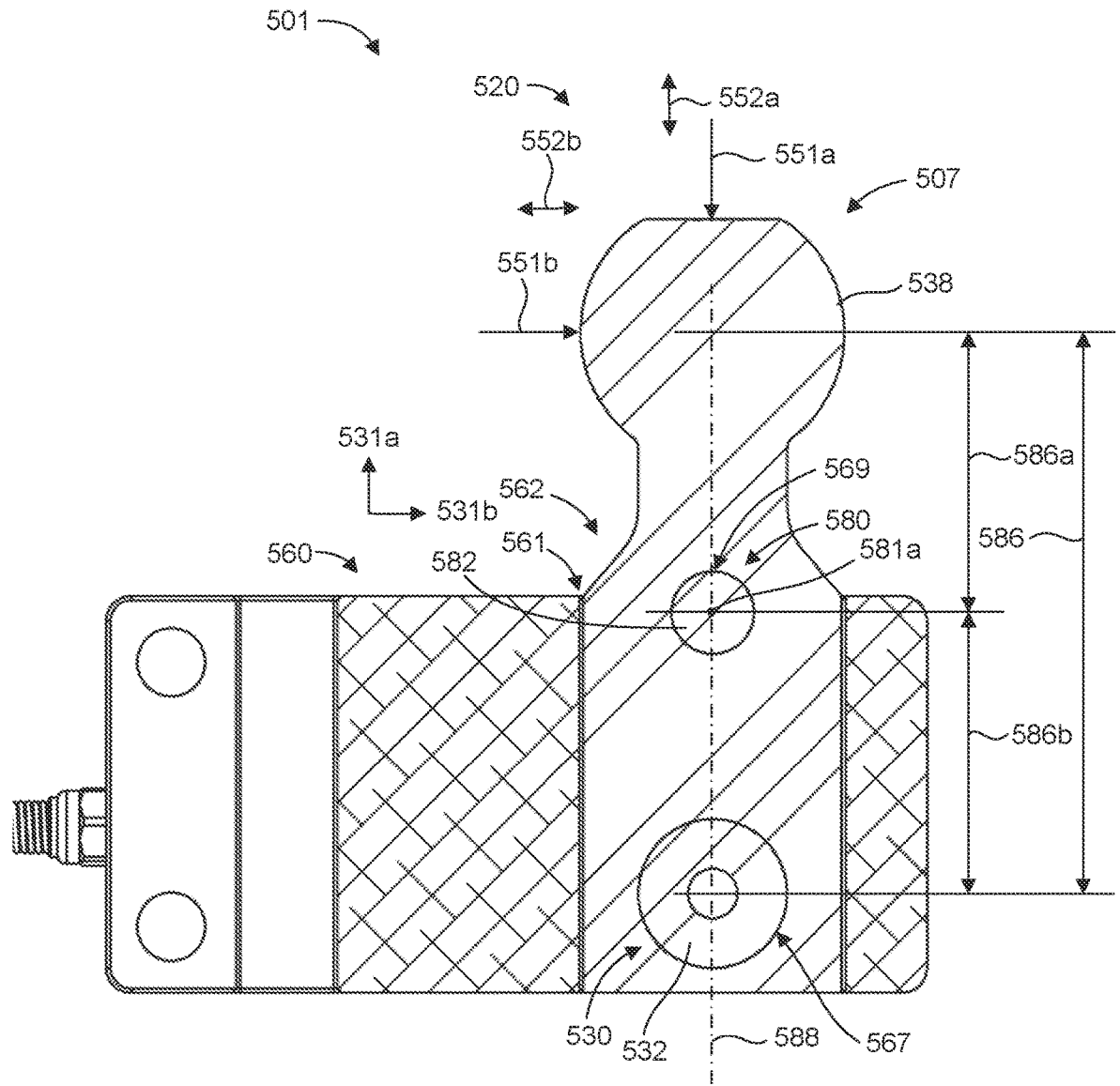
FIGS. 5C and 5D illustrate side cross-sectional views of the load measuring hitch assembly of FIGS. 4A and 4B.
Figure 5D:
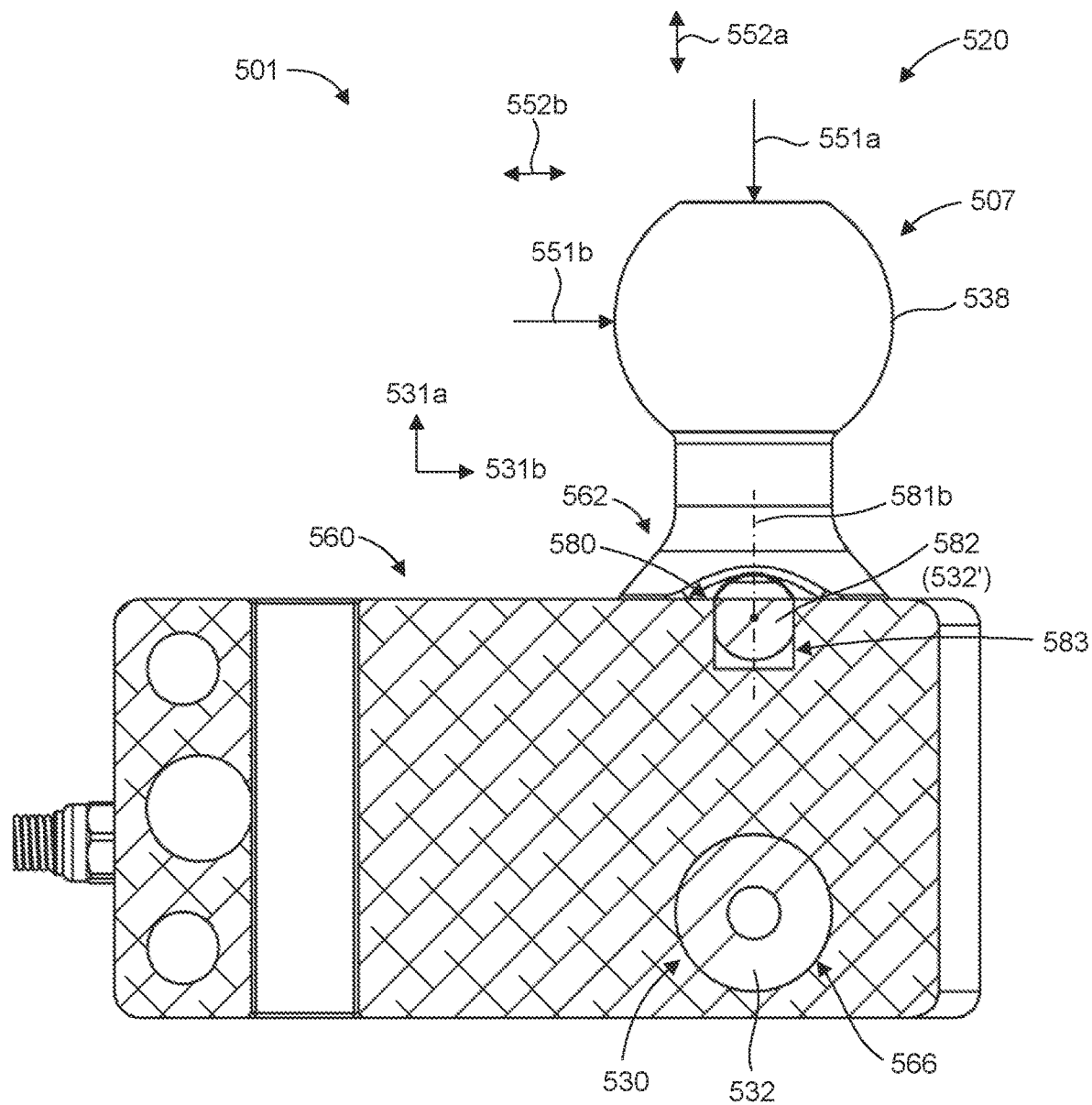

FIGS. 5A-5D illustrate a load measuring hitch assembly 501 in accordance with an example of the present disclosure. Specifically, FIGS. 5A and 5B illustrate perspective views of the load measuring hitch assembly 501 and FIGS. 5C and 5D illustrate a side cross-sectional views of the load measuring hitch assembly 501. The load measuring hitch assembly 501 can include a body portion 560 operable to facilitate coupling the load measuring hitch assembly 501 to a tow vehicle, a load measurement device 530 (e.g., a load cell, such as a strain gauge load cell configured as a load pin) operable to measure force in at least two measurement axes 531a, 531b (FIG. 5C), and a ball portion 520 having a hitch ball 507 (e.g., a ball 538) operable to facilitate coupling the load measuring hitch assembly 501 to a trailer. The load measurement device 530 can be operably associated with the body portion 560 and the ball portion 520 to determine a magnitude of a force 551a, 551b acting on the hitch ball 507 (e.g., through the trailer interface with a ball 538) in at least one of the two directions 552a, 552b. For example, the ball portion 520 and the body portion 560 can be coupled to one another via the load measurement device 530 (e.g., a load cell) and a pin slot joint 580. The pin slot joint 580 can comprise a pin 582 and a slot 583 (FIG. 5C). The pin slot joint 580 can provide relative motion between the ball portion 520 and the body portion 560 in a rotational degree of freedom about an axis 581a (out of the page) and a translational degree of freedom along an axis 581b. In the illustrated example, the axis 581b is vertically oriented. The axes 581a, 581b can be orthogonal to one another. The rotational and translational degrees of freedom between the ball portion 520 and the body portion 560 can facilitate transfer of a force to the load measurement device 530 in the measurement axes 531a, 531b, thereby facilitating determining a magnitude of at least one of the vertical force 551a or the horizontal force 551b acting on the ball 507 (e.g., the ball 538).

In one aspect, the body portion 560 can include or define a hitch ball opening or socket 561 that can receive a lower portion 562 of the hitch ball 507 and facilitate coupling the hitch ball 507 to the body portion 560. The hitch ball opening 561 can be a through-hole (as illustrated) or a blind-hole.

The body portion 560 and the hitch ball 507 can be configured to interface with the load measurement device 530. For example, the load measurement device 530 can comprise a load cell. The body portion 560 and the hitch ball 507 can include or define respective load cell interfaces 566, 567 (FIGS. 5C and 5D).

In one aspect, body portion 560 and the hitch ball 507 can each form at least a portion of the pin slot joint 580. For example, the body portion 560 can include or define the slot 583 (FIG. 5D). In the illustrated example, the pin 582 has parallel flat surfaces configured to interface with flat surfaces of the slot 583 formed in the body portion 560. In addition, the hitch ball 507 can include a pin opening 569 that defines a rotational interface surface for the pin 582. In this case, the pin 482 can rotate about the axis 481a relative to the hitch ball 507 (FIG. 5C). Thus, the pin 582 can be associated (e.g., movable) with the hitch ball 507 and the slot 583 can be associated with the body portion 560.

With particular reference to FIG. 5C, it can be observed that the ball 538 and the load measurement device 530 (e.g., the load cell or transducer 532) may be spatially separated from one another in the vertical direction 552 by a distance 586. The use of the pin slot joint 580 in combination with the load measurement device 530 to couple the ball portion 520 (e.g., the hitch ball 507) and the body portion 560 to one another can enable the load measurement device 530 to sense the force transferred from the hitch ball 507 to the load measurement device 530 (e.g., the load cell or transducer 532) in the measurement axes 531a, 531b. More specifically, the two degrees of freedom (e.g., about the axis 581a and along the axis 581b) provided by the pin slot joint 580 can facilitate an unconstrained transfer of the force 551a, 551b applied to the ball 538 to the load measurement device 530 (e.g., the load cell or transducer 532), which can be sensed as force components in the measurement axes 531a, 531b. In general, therefore, the measured force components in the measurement axes 531a, 531b can be related to the force 551a, 551b acting on the hitch ball 507 based on known geometry and engineering principles to determine the magnitudes of the vertical force 551a and the horizontal force 551b.

In some examples, the geometry and relationships between the ball 538, the pin slot joint 580, and the load measurement device 530 (e.g., the load cell or transducer 532) can be selected to simplify at least some of the calculations. In the illustrated example, the measurement axes 531a, 531b can be oriented parallel to the respective vertical and horizontal directions 552a, 552b, and the translational degree of freedom along the axis 581b can be oriented parallel to the vertical direction 551a. In one aspect, the load cell or transducer 532 can be located vertically offset from the ball 538. In this case, the load cell or transducer 532 and the pin slot joint 580 are located (directly) below the ball 538. The pin slot joint 580 can be located between the load cell or transducer 532 and the ball 538. The ball 538 can be located vertically offset from the pin slot joint 580 by a distance 586a. The load cell or transducer 532 can be located vertically offset from the pin slot joint 580 by a distance 586b. Thus, the horizontal force 551b can cause the ball portion 520 (e.g., the hitch ball 507) to rotate about the axis 581a of the pivot slot joint 580 and exert a force on the load cell or transducer 532 in the horizontal direction 552b. The distances 586a, 586b can be substantially equal, which can simplify the calculations to determine the magnitude of the horizontal force 551b.

In one aspect, the horizontal relationship of the ball 538 and the load measurement device 530 (e.g., the load cell or transducer 532) can be configured to simplify the calculations necessary to determine the vertical force 551a. For example, the ball 538 and the load cell or transducer 532 can be located at the same horizontal position (e.g., in the same vertical plane 588). In other words, the load cell or transducer 532 is located directly below the ball 538 so there is no horizontal offset between the ball 538 and the load cell or transducer 532. Because the axis 581b is vertically oriented (i.e., parallel to the vertical direction 551a), the force applied to the load cell or transducer 532 due to the vertical force 551a will therefore have a component in only the direction 552a, which can simplify the calculations to determine the magnitude of the vertical force 551a. In some examples, the load measurement device 530 can be calibrated to correctly indicate the force 551a, 551b acting on the hitch ball 507.

In some examples, the pin 582 can be configured as a load cell or transducer 532' (FIG. 5D) that functions as part of the load measurement device 530. In the illustrated example, the slot 583 is configured to provide a translational degree of freedom along a vertically oriented axis 581b. Thus, the load cell or transducer 532' can measure force in the measurement axis 531b, which can be parallel to the horizontal direction 552b and therefore used to determine the magnitude of the horizontal force 551b. The load cell or transducer 532 can be configured to measure force in the measurement axis 531a, which can be parallel to the vertical direction 552a and therefore used to determine the magnitude of the vertical force 551a. The load cell or transducer 532, 532' configurations described above can isolate vertical and horizontal loads to a given load cell or transducer 532, 532', which can each be configured to measure or sense force in only a single axis or direction. Thus, the load cells or transducers 532, 532' can each individually be used to determine a magnitude of a vertical or a horizontal force.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A load measuring hitch assembly, comprising:
   a body portion operable to facilitate coupling the load measuring hitch assembly to a tow vehicle;
   at least one load cell operable to measure force in at least one measurement axis; and
   a ball portion having a ball operable to facilitate coupling the load measuring hitch assembly to a trailer, the ball portion and the body portion being coupled to one another via the load cell and a pin slot joint, the pin slot joint providing relative motion between the ball portion and the body portion in a rotational degree of freedom about a first axis and a translational degree of freedom along a second axis, the first and second axes being orthogonal to one another,
   wherein the rotational and translational degrees of freedom between the ball portion and the body portion facilitate transfer of a force to the load cell in the at least one measurement axis, thereby facilitating determining a magnitude of at least one of a vertical or a horizontal force acting on the ball.

2. The load measuring hitch assembly of claim 1, wherein the ball portion comprises:
   a hitch ball that includes the ball and a lower portion; and
   a hitch ball support configured to interface with the at least one load cell and form at least a portion of the pin slot joint, the hitch ball support defining a hitch ball opening that receives the lower portion of the hitch ball and facilitates coupling the hitch ball to the hitch ball support.

3. The load measuring hitch assembly of claim 2, wherein the pin slot joint comprises a pin associated with the body portion and a slot associated with the hitch ball support.

4. The load measuring hitch assembly of claim 2, wherein the hitch ball opening is at least partially defined by a first threaded interface configured to engage a second threaded interface of the lower portion of the hitch ball.

5. The load measuring hitch assembly of claim 1, wherein the at least one load cell comprises one or more strain gauges.

6. The load measuring hitch assembly of claim 1, wherein the at least one load cell is configured as a load pin.

7. The load measuring hitch assembly of claim 1, wherein the pin slot joint is located between the at least one load cell and the ball.

8. The load measuring hitch assembly of claim 1, wherein the at least one load cell is located horizontally offset from the ball.

9. The load measuring hitch assembly of claim 8, wherein the at least one load cell and the ball are located at the same vertical position.

10. The load measuring hitch assembly of claim 8, wherein the second axis is horizontally oriented.

11. The load measuring hitch assembly of claim 1, wherein the at least one load cell is located vertically offset from the ball.

12. The load measuring hitch assembly of claim 11, wherein the at least one load cell is located below the ball.

13. The load measuring hitch assembly of claim 11, wherein the second axis is vertically oriented.

14. The load measuring hitch assembly of claim 1, wherein the ball portion comprises a hitch ball that includes the ball and a lower portion configured to interface with the at least one load cell and form at least a portion of the pin slot joint, and the body portion defines a hitch ball opening that receives the lower portion of the hitch ball.

15. The load measuring hitch assembly of claim 14, wherein the pin slot joint comprises a pin associated with the lower portion of the hitch ball and a slot associated with the body portion.

16. The load measuring hitch assembly of claim 1, wherein the at least one load cell comprises a first load cell operable to measure force in a first measurement axis parallel to a vertical direction, and a second load cell operable to measure force in a second measurement axis parallel to a horizontal direction, and wherein the pin slot joint comprises a pin configured as the first or second load cell, and the second axis is parallel to the vertical direction or the horizontal direction.

17. The load measuring hitch assembly of claim 16, wherein the pin is configured as the first load cell, and the second axis is parallel to the horizontal direction.

18. The load measuring hitch assembly of claim 16, wherein the pin is configured as the second load cell, and the second axis is parallel to the vertical direction.

19. The load measuring hitch assembly of claim 1, wherein the at least one load cell is a single load cell operable to measure force in a first measurement axis and a second measurement axis.

20. The load measuring hitch assembly of claim 19, wherein the first measurement axis is parallel to a vertical direction and the second measurement axis is parallel to a horizontal direction.

21. The load measuring hitch assembly of claim 1, wherein the pin slot joint comprises a pin having a cylindrical configuration.

22. The load measuring hitch assembly of claim 1, wherein the pin slot joint comprises a pin having parallel flat surfaces configured to interface with flat surfaces of a slot.

23. The load measuring hitch assembly of claim 1, further comprising a hitch portion removably coupleable to the body portion, the hitch portion being configured to interface with an attachment structure associated with the tow vehicle to facilitate coupling the load measuring hitch assembly to the tow vehicle.

24. A trailer hitch system, comprising:
   the load measuring hitch assembly of claim 1 operably coupled to the tow vehicle.

25. A method of measuring loads applied by a trailer on a tow vehicle, comprising:
   operably coupling the load measuring hitch assembly of claim 1 to the tow vehicle; and
   engaging a coupling device of the trailer with the load measuring hitch assembly.

* * * * *